United States Patent
Mital et al.

(10) Patent No.: US 9,032,314 B2
(45) Date of Patent: May 12, 2015

(54) PROPOSING VISUAL DISPLAY COMPONENTS FOR PROCESSING DATA

(75) Inventors: Vijay Mital, Kirkland, WA (US); Darryl Ellis Rubin, Duvall, WA (US); David G. Green, Redmond, WA (US); John A. Payne, Seattle, WA (US); Suraj T. Poozhiyil, Redmond, WA (US); Ahmad Nizam Anuar, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 667 days.

(21) Appl. No.: 12/958,206

(22) Filed: Dec. 1, 2010

(65) Prior Publication Data

US 2012/0144325 A1 Jun. 7, 2012

(51) Int. Cl.
G06F 3/048 (2013.01)
G06F 9/44 (2006.01)
G06F 3/0484 (2013.01)

(52) U.S. Cl.
CPC .......... *G06F 9/4446* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 6,995,768 | B2 * | 2/2006 | Jou et al. | 345/440 |
| 7,734,607 | B2 | 6/2010 | Grinstein et al. | |
| 8,095,434 | B1 * | 1/2012 | Puttick et al. | 705/26.9 |
| 8,209,687 | B2 * | 6/2012 | Yuyitung et al. | 718/1 |
| 8,429,203 | B2 * | 4/2013 | Perez et al. | 707/804 |
| 2002/0070953 | A1 * | 6/2002 | Barg et al. | 345/700 |
| 2006/0112123 | A1 | 5/2006 | Clark et al. | |
| 2006/0262145 | A1 * | 11/2006 | Zhang et al. | 345/661 |
| 2009/0089174 | A1 * | 4/2009 | Brunner et al. | 705/26 |
| 2009/0287814 | A1 | 11/2009 | Robertson et al. | |
| 2010/0194778 | A1 | 8/2010 | Robertson et al. | |
| 2011/0202422 | A1 * | 8/2011 | Brunner et al. | 705/26.5 |
| 2012/0011458 | A1 * | 1/2012 | Xia et al. | 715/771 |

OTHER PUBLICATIONS

Daniel A. Keim et al., "Visual Analytics: Combining Automated Discovery with Interactive Visualizations", University of Konstanz, Germany, publication date 2008, pp. 1-13.

(Continued)

*Primary Examiner* — William Bashore
*Assistant Examiner* — Hien Duong
(74) *Attorney, Agent, or Firm* — Kevin Sullivan; Kate Drakos; Micky Minhas

(57) ABSTRACT

A pattern of visual interactivity may be automatically proposed for processing a data set that exhibits dimensions of variability. A visual display component may be analyzed to assess whether it is capable of receiving user input representing changes that correspond to types of changes of the identified dimensions of the data set. A suitable visual display component may be provided as a suggestion on a user interface for potentially using the visual display component to allow a user to interact with the data. In some embodiments, a visual display component includes a number of visual objects and/or visually interactive components for use within a graphical user interface. A visual display component may include one or more analytic patterns having at least one of an equation, rule, constraint, expression or combination thereof that represents the analytic pattern. Alternatively, a visual display component may involve a visual display representation of data through visual characteristics of a graphical object.

20 Claims, 22 Drawing Sheets

(56) References Cited

OTHER PUBLICATIONS

Hong Chen, "Towards Design Patterns for Dynamic Analytical Data Visualization", Analytical Solutions Division, SAS Institute Inc., Cary, NC, USA, publication date 2004, 12 pages.

Peter Klein, "The CircleSegmentView: A User Centered, Meta-data Driven Approach for Visual Query and Filtering", Doctoral Dissertation, University of Konstanz, Germany, Jun. 2, 2006, 189 pages.

Ed Huai-Hsin Chi, "A Framework for Information Visualization Spreadsheets", Doctoral Thesis, University of Minnesota, Mar. 8, 1999, 160 pages.

* cited by examiner

PROPOSING VISUAL DISPLAY COMPONENTS FOR PROCESSING DATA

BACKGROUND

Today, people are regularly exposed to large amounts of data and often seek to manipulate such data in a number of ways. Computing environments provide the ability for users to analyze such large amounts of data. In some cases, data is manipulated graphically through a visually interactive user display.

Data may be imported, for example, into a spreadsheet where a user is able to process expressions of data according to a variety of functions. For instance, cells in a spreadsheet can contain expressions in the form of items of data and/or functions that may be employed as operations on data. An expression can refer to other cells in a spreadsheet as inputs to the expression, such that a value computed for a first cell may depend on values contained within other cells. In such cases, the result of an evaluation of an expression in the form of a function can be visible in the same cell as the expression. For example, if a cell contains an equation that uses values contained in other cells to make a calculation, the original cell may output the result of the calculation in place of the equation itself. Expressions of data can also be visualized through a chart or graph created through the spreadsheet program. Alternatively, expressions of data can be accessed through the spreadsheet via a software program.

SUMMARY

Aspects relate to analyzing a data set and proposing a pattern of visual interactivity so as to allow a user to specify, using a graphical user interface, changes of data within at least one dimension of the data set. Based on parameters gathered through an analysis of a data set, a visual display component may be suggested to a user for the user to suitably interact with the data set. In various embodiments, a data set is analyzed to identify a dimension of the data that exhibits a degree of variability. In some embodiments, a visual display component is analyzed to determine a capability for the visual display component to receive input through a user interface that indicates a pattern of visual interactivity with a dimension of the data. One or more visual display components are also analyzed to identify a visual display component capable of receiving user input representing a change and/or a pattern of interaction in at least one of the identified dimensions of the data set. The identified visual display component may be presented as a suggestion to a user on a suitable user interface. If selected, the visual display component may be incorporated on the user interface for interaction with a variable dimension of the data set.

In some embodiments, a visual display component may be selected from a library of visual display components (e.g., available as pre-packaged components) where the selected visual display component is able to receive a user input for manipulating and/or interacting with one or more dimensions of a data set according to a pattern. In some cases, a visual display component is matched to the data set based on characteristics of the visual display component that are conducive to change and/or visual interactivity based on particular dimensions of variability of the data and/or the structure of the data. An output may be generated on a user interface and presented to the user in the form of a suggestion to implement the identified visual display component. Accordingly, the user interface may receive input to select the visual display component and produce a graphical representation of the visual display component so that one or more appropriate user inputs may manipulate aspects of the visual display component to process and manipulate portions of the data set.

Visual display components may include any suitable pattern of visual interactivity. Visual display components may also include one or more visual elements and/or visually interactive components that can be included in an existing graphical user interface. For example, a visual display component may include one or more analytic patterns captured in reusable components that may be applied to data providing a user with the ability to use complex analytic logic in forming a solution via a visual interface. An analytic pattern may include at least one of an equation, rule, constraint, expression or combination thereof that represents the analytic pattern. As another example, a visual display component may involve visual representation of data through an arbitrary graphical object. The graphical object may have visual characteristics with capacity to visually represent data. Accordingly, dimensions of data may be mapped to corresponding visual characteristics of a graphical object in a manner where values of the data influence the appearance of the visual characteristic(s). Visual characteristics and/or data itself may further be subject to one or more filters and/or constraints, resulting in a modified rendering of a visual representation of data based on the applied filter(s) and/or constraint(s). In some cases, items within dimensions of data represented through visual characteristics of a graphical object may be altered in accordance with user input designating suitable alteration of the data.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

Figure 16:
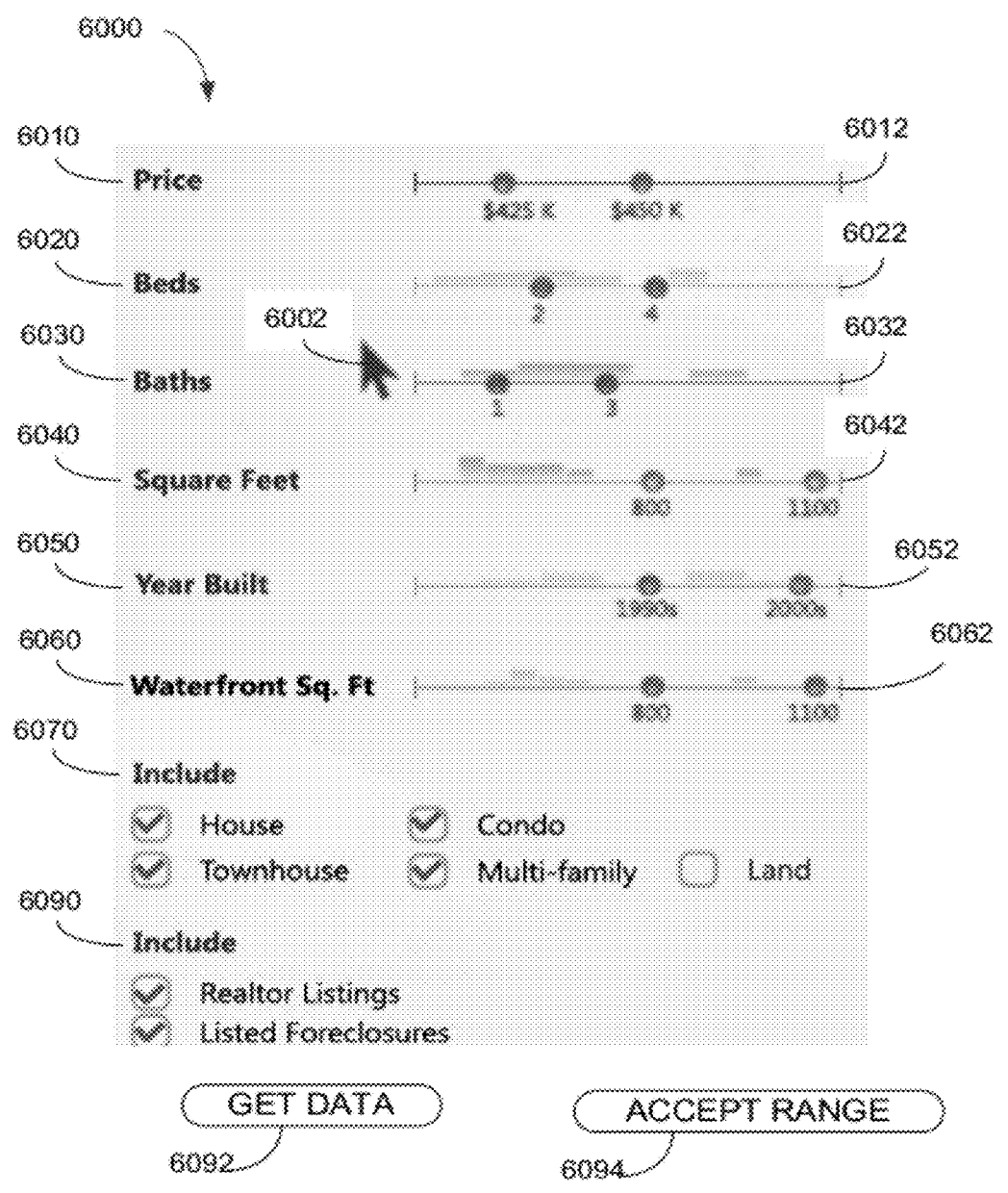

FIG. 16 is an illustrative example of a visual display component in a user interface through which a user is able to specify filter criteria to be applied to filter the data set;

FIG. 18 is an illustration of the user interface of FIG. 17 where the range of the master dimension is increased;

FIG. 19 is an illustration of the user interface of FIG. 18 in a state in which a particular value in a subordinate dimension is being specified;

FIG. 21 is an illustration of the user interface of FIG. 20 in a state in which a range of values for the master dimension that, if specified as a filter criteria, yields the specified value for the subordinate dimension; and FIG. 22 is an illustration of the user interface of FIG. 21 where a specified value for the subordinate dimension is further increased.

DETAILED DESCRIPTION

Figure 1:
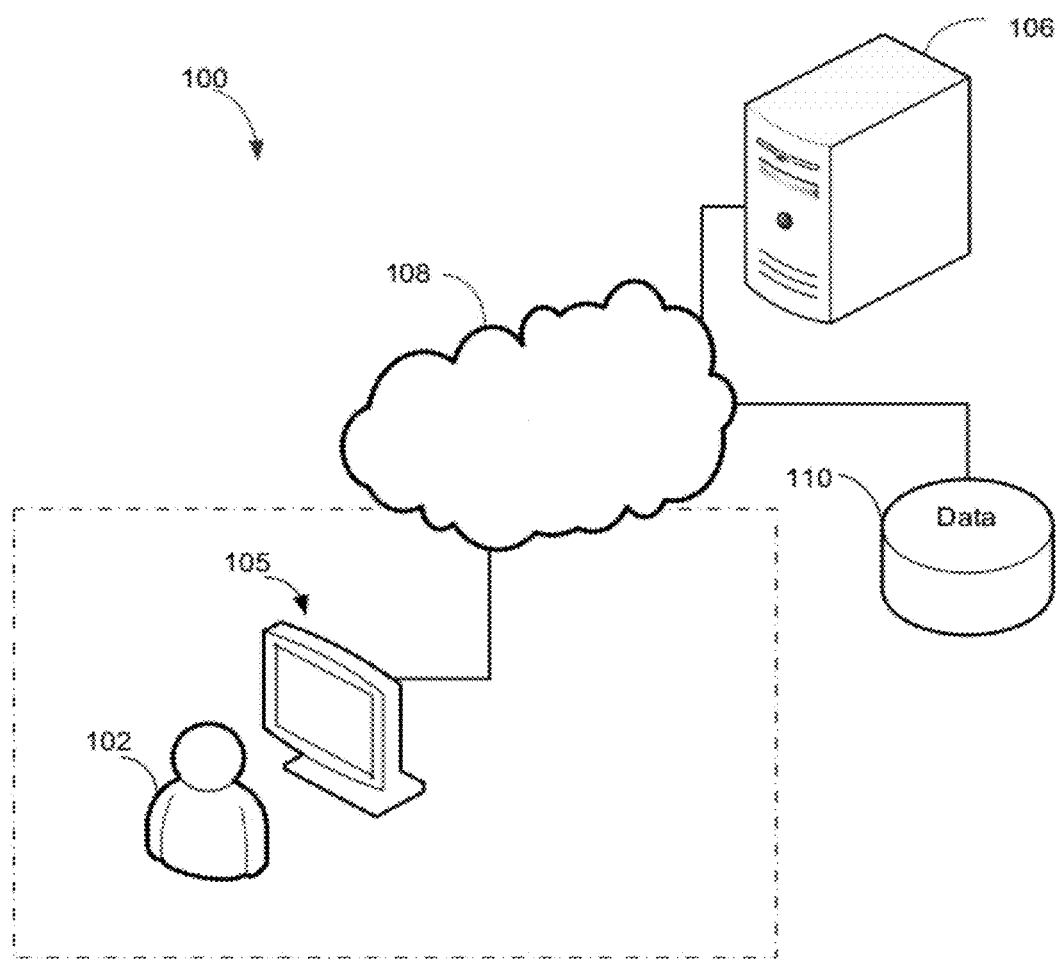
FIG. 1 is a high-level block diagram illustrating a computing environment in which some embodiments may be practiced.

The inventors have recognized and appreciated the advantages for information worker users to employ patterns of visual interaction with analytic patterns, graphical objects and/or other visually interactive components to provide higher order analytic abilities in data analysis than the mere spreadsheet-like expressions (e.g., cells, tables, charts) traditionally available. For example, analytic patterns may include rules, equations, constraints, expressions as well as complex data structures, such as nested data, or combinations thereof. Alternatively, graphical objects may have visual characteristics that can map to particular dimensions of a data set. However, it has been recognized that it can be cumbersome for users to select visual objects or visual elements having capabilities for manipulating various types of data. Accordingly, aspects described herein relate to the ability for a visual pattern of interaction to be automatically proposed to a user through a user interface of a computing device based on analyses performed of available visual display components and dimensions of a data set.

In some embodiments, one or more visual display components may be pre-packaged and accessible in a library where, through an appropriate interface, a user selects a visual display component based on the capacity for the visual display component to manipulate and/or process one or more dimensions of a data set. An analysis may be performed on a data set and each of the available visual display components in the library and a mapping may be generated for the data set and one or more visual display components capable of receiving user input that represents a change in at least one dimension of the data set. A user may be presented with a suggestion on a user interface for activating and incorporating the visual display component within the user interface so that the user may manipulate one or more dimensions of the data set.

Visual display components may have the ability to implement any suitable pattern of visual interactivity. Visual display components may also include one or more visual elements and/or visually interactive components that may be included in an existing graphical user interface. In some embodiments, a menu of visual display components suitably configured for interaction with a data set is presented on a graphical user interface to provide suggestions for the selection of one or more visual display components to incorporate in the user interface. Once a visual display component is selected, for example, through a user input, the visual display component can be suitably associated with the data set for alteration of features of the data set, such as through a data input feature of the visual display component.

In some embodiments, a visual display component analyzed by a system and proposed through a user interface for manipulating data incorporates an analytic pattern programmed to receive a data input and evaluate at least one of an equation, rule, constraint or expression concerning the input of data to generate an output result based on data input having been operated upon. An analytic pattern of a visual display component may include metadata that describe parameters through which the analytic pattern operates. In some cases, a processor analyzes the metadata of an analytic pattern and produces a determination as to how aspects of the analytic pattern may be adjusted to suit one or more relationships through which the data may be modified. For example, a change in the data input to an analytic pattern may result in the analytic pattern being re-calculated or re-solved based on how the data was modified.

In some embodiments, a visual display component that has been analyzed by a system as to whether the visual display component is suitable for manipulating data and proposed to a user through a user interface includes a visual object having visual characteristics that have the capacity to represent certain dimensions of variability of data in a data set. The visual object may be, for example, a graphical object that is created through a suitable graphical manipulation tool. Dimensions of data may be mapped to visual characteristics of a graphical object to form a visual object where the appearance of the visual characteristic(s) are affected by values of the data. In some cases, only a subset of the data set is visually displayed through the graphical object. A visual object may be included within a graphical object, representing variable dimensions of a data set. One or more filters and/or constraints may be applied to the visual characteristics and/or the data itself to result in an updated visual display component representing the data. After receiving appropriate input, particular items of data in a data set may also be modified through the visual display component.

A visual display component in the form of a visual object may include metadata that provides information on how data can be bound to characteristics of a visual object. A processor may analyze the metadata to determine whether characteristics of a visual object may be modified in a way that corresponds with variability in the data set. In some instances, such analysis may entail examining constraints of the visual object to determine whether the data set will be suitably represented subject to those constraints. For example, a data set represented in a visual display component may be re-scaled. Or, a visual characteristic of a visual display component may be transformed to another visual characteristic. A visual characteristic of a visual display component may be re-colored or re-shaded and such a characteristic may make a visual display component suitable for depicting a dimension of data that has a number of possible values representing gradations of a certain parameter. In some cases, visual characteristics of a visual display component are limited in how their appearance may be modified in accordance with aesthetic rules for the visual object such as rules of proportions. Indeed, although dimensions of data may be mapped to visual characteristics in a suitable visual display component, the visual display component may have limitations so as not to take on, for example, a substantially distorted configuration. An automated tool for suggesting a visual display component may take such constraints into account.

An analysis of potential visual interactivity may be performed on a data set and one or more visual display components so as to determine what patterns of change or visual interactivity would be appropriate for various dimensions of the data set. Based on such an analysis of the data set and the analysis of available visual objects, particular visual characteristics, visual objects and/or visual affordances may be presented to a user as suggestions for use when interacting with the data set. In some embodiments, a system may propose suggestions for incorporating a visual display component by generating multiple choices of visual objects or visual affordances that visually display on the user interface an effect of the proposed pattern of visual interactivity with a dimension of the data. For example, a user may be able to preview the potential effects of a proposed visual display component, such as how data can be visually filtered through a slider element, on a dimension of data and make a determination as to whether the visual display component will be incorporated in the user interface for interacting with the data according to its pattern of interactivity. In some cases, the ability to preview effects of a proposed visual display component may be enhanced by a visual affordance. For example, a hotspot or a handle located at the top of a visual object (e.g., a bar of a chart) may enable a user to provide input to the system for the visual object to be suitably manipulated (e.g., dragged up and down). Once the determination is made to include the pattern of interactivity provided by the visual display component, the user may provide an input into the system to execute the visual display component.

In a data set having dimensions that can be characterized by a continuous pattern of change, certain visual objects and/or characteristics may be suitable to represent this pattern of change. For example, visual elements that may be suitable for representing a continuous pattern of data include sliders, text boxes and/or resizing parameters. In some case, such visual elements may be incorporated in a visual display component offered by the system as a suggestion for processing and/or modifying items of data.

For dimensions of data that can be represented by quantized patterns of modification, other visual elements and/or visual characteristics may be proposed where discrete adjustments can be made in accordance with quantized changes in the dimensions. For example, check boxes, menu selectors and/or snap-to features may be useful in a visual display component for representing a quantized set of data that can be appropriately modified.

For dimensions of data that can be displayed as a change in location, a user interface may suggest a visual display component having a visual element and/or visual characteristic having Cartesian geometries where an icon representing a particular item of data maneuvers along a Cartesian map display. In some cases, an appropriate pattern of interactivity in a visual display component may be suitable for certain dimensions of data where a number of alternatives are traversed, for example, where a user scrolls through data, flips pages and/or changes the position of a focus/highlight on a screen.

In some embodiments, a processor analyzes metadata associated with a visual display component and a data set and generates a proposed pattern of visual interactivity through which the data may be processed. By analyzing the metadata, indications may arise for what operations may potentially be performed on the data to suit one or more desired functions in a visual display. Certain features of visual display components may be identified as being useful in a visual interface, such as for example, slider components through which variations of certain dimensions of data may be continuously displayed as a master dimension of data is adjusted. Visual affordances or patterns of visual interactivity may also be identified as adding value to a visual interface, such as the ability to drag a visual element on a screen toward another visual element for the two visual elements to appropriately interact, such as through a drag hook. For example, dragging one visual element on to another on a screen may result in a set of instructions represented by the first visual element to be executed and applied to data represented by the second visual element. Analysis may include identifying relationships between dimensions of data and visual objects capable of graphically representing data with the relationship.

Such analysis may result in duplication of multiple visual objects possibly suitable for representing dimensions of a data set. In that scenario, multiple choices of patterns of visual interactivity may be proposed on a user interface in the form of visual display components. Accordingly, a user may provide input to a user interface for selecting a suitable visual display component. In some embodiments, a suggestion for incorporating a particular visual display component configured for interaction with a data set in the user interface includes presenting an animation on the user interface that displays the proposed visual display component for the user to be able to select.

FIG. 1 is a high level diagram illustrating a computing environment 100 in which some embodiments of the invention may be practiced. Computing environment 100 includes a user 102 interacting with a computing device 105. Computing device 105 may be any suitable computing device, such as a desktop computer, a laptop computer, a mobile phone, or a PDA. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, a corporate intranet, or cellular networks. Server 106 may be implemented using any suitable computing architecture, and may be configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system. Computing device 105 may also have access to any suitable source of data 110.

In the embodiment of FIG. 1, a data analysis system may execute on server 106, and computer 105 may provide a user interface through which a user may enter inputs and receive results. However, there is no requirement that the data analysis system execute on a server and it may, for example, execute wholly on computer 105.

Regardless of the type of input provided by user 102 that triggers generation of an input, computing device 105 may send the input to server 106 to obtain information relevant to the input. That information may be obtained from one or more data sets stored in database 110 which is also accessible over network 100. As part of retrieving or generating data relevant to the input, server 106 may apply one or more declarative analytic patterns to the data to generate higher level information to be returned to user 102. The information generated by server 106 may be sent over computer network(s) 108 and be displayed on a display of computing device 105. A display may be any suitable display, including an LCD or CRT display, and may be either internal or external to computing device 105.

Figure 2:
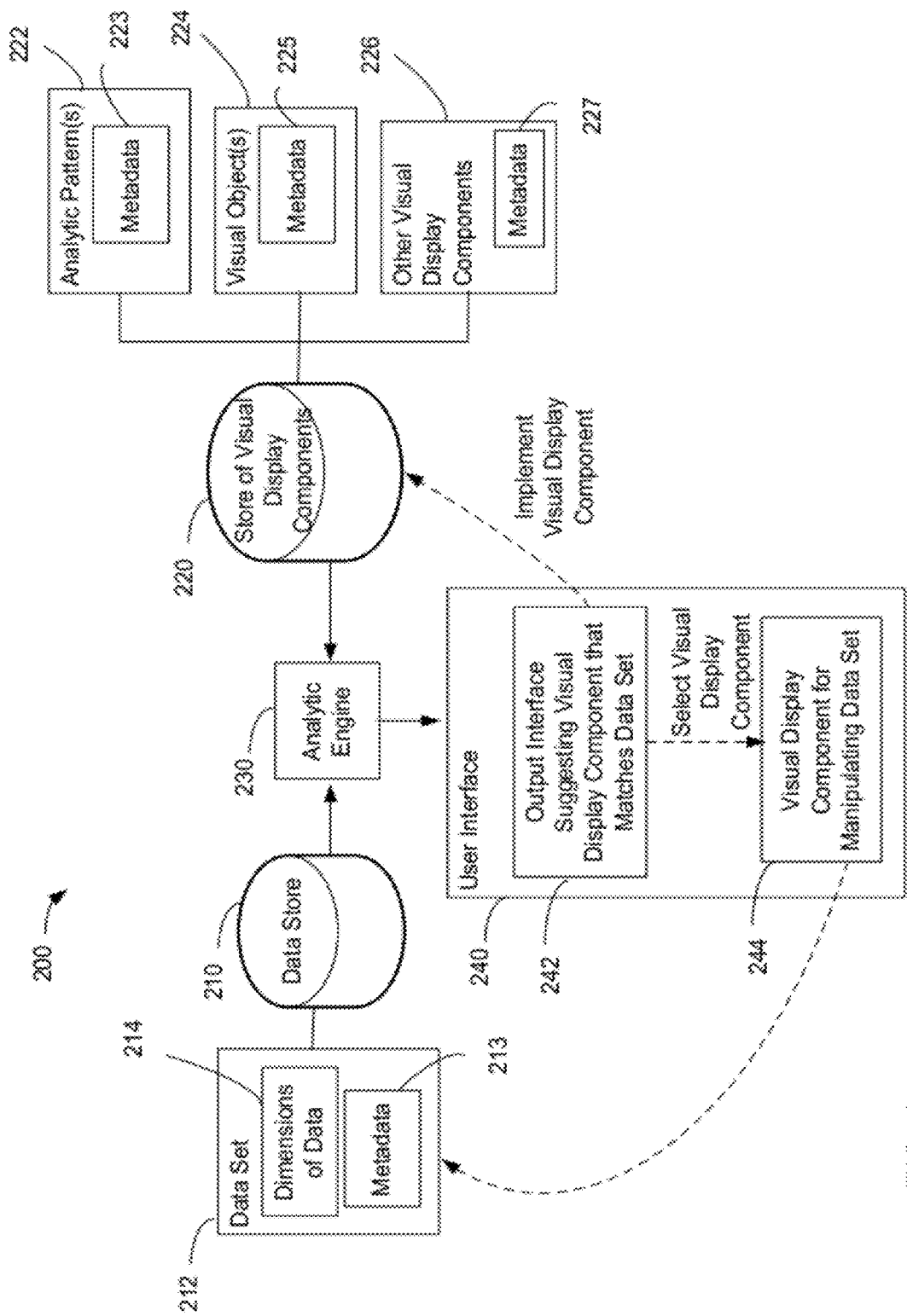
FIG. 2 is a schematic diagram of a system for suggesting use of a visual display component.

FIG. 2 depicts an illustrative diagram of a system 200 for selecting a visual display component suitable for interacting with a dimension of a data set. The system 200 includes a data store 210, a store of visual display components 220, an analytic engine 230 and a user interface 240.

The data store 210 includes any suitable set of data. Data set 212 may include metadata 213 defining parameters associated with the data set. For example, metadata 213 of a data set 212 includes information on how data may be organized or presented. Aspects of the data set 212 may be categorized by dimensions of data 214. In an example, for real estate data, various dimensions of data may include price, location, number of rooms and square footage. In some cases, one or more dimensions of the data set may be variable. Aspects of the data set 212 may be displayed and/or operated upon through a visual display component on a user interface 240.

The store of visual display components 220 may include a selection of visual display components configured to receive user input indicating a change in at least one of the dimensions of a data set. The visual display components may be in one or more formats. In some embodiments, the store of visual display components 220 may include one or more analytic patterns 222 having metadata 223 associated with each analytic pattern. Analytic patterns may perform one or more operations on the data that may change the data or may be evaluative in nature, without changing the data. Visual display components may include one or more visual objects 224 having the capacity to represent data through a display may also be included in the store of visual display components 220. Visual objects 224 may also include metadata 225 providing information regarding how visual characteristics of the objects 224 may represent data. Other visual display components 226 having associated metadata 227 may also be provided in the store 220. In some embodiments, as discussed above, visual display components are stored as a library of components accessible to a system for matching one or more visual display components to a data set having at least one dimension with a degree of variability.

The system 200 includes an analytic engine 230 for analyzing visual display components in the store 220 in conjunction with the data set 212. The analytic engine 230, for example, may step through the metadata of the data set 212 and each of the visual display components and determine which visual display component(s) may match the data set, that is, if the visual display component is capable of receiving input that effects a change in a dimension of data that may be variable. The analytic engine 230 may match a number of visual display components to the data set 212, resulting in a display of the visual display component(s) on an output interface 242 of the user interface 240 as suggestions (e.g., on a graphical menu) for a user to choose which visual display component(s) to implement. When a visual display component is selected and implemented, the user interface 240 will present the visual display component 244 on a display for suitable manipulation of the data. Accordingly, upon receiving input, for example, through the user interface, the selected visual display component 244 may access and modify certain items of data in the data set 212.

Figure 3:
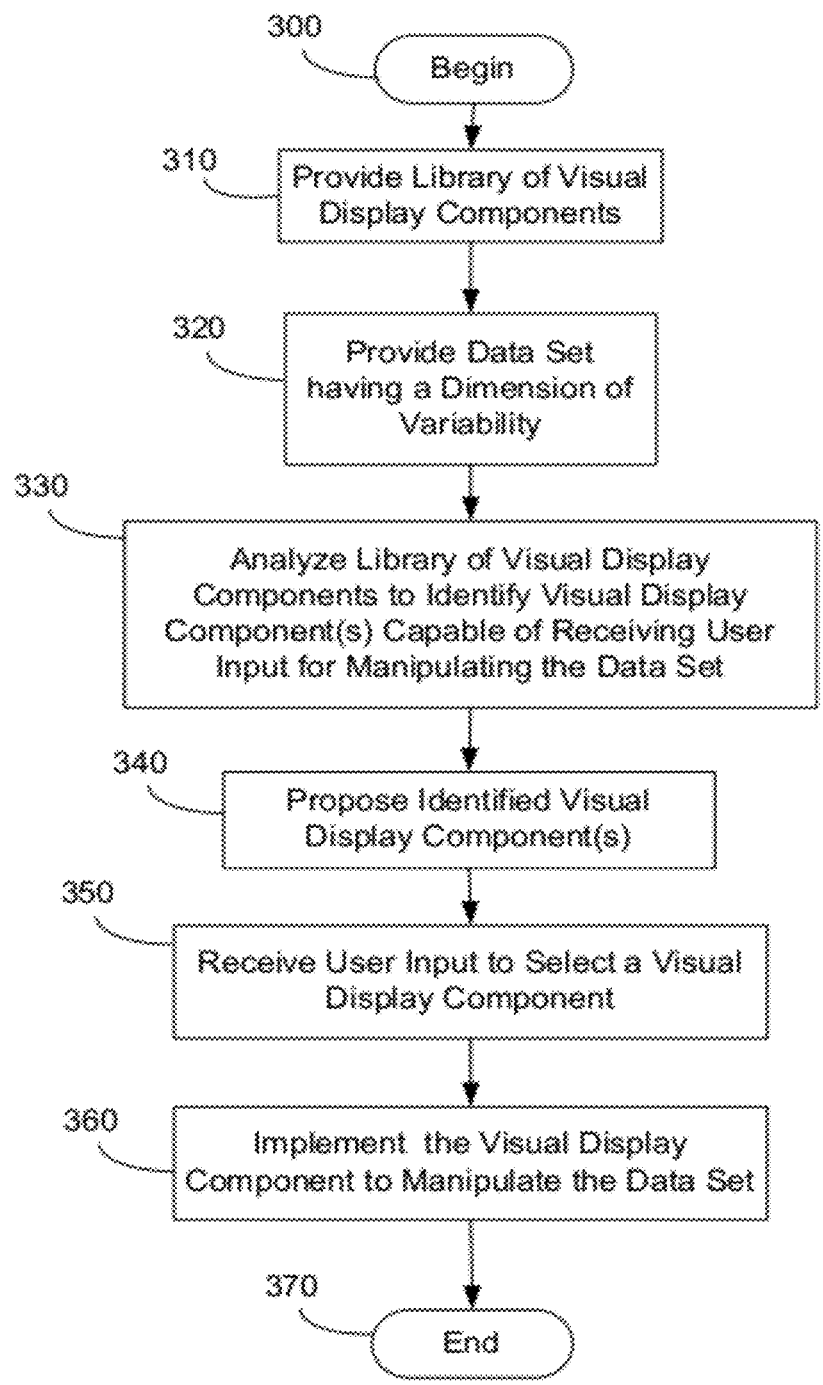
FIG. 3 is a flow chart of an embodiment for proposing a visual display component to process data.

FIG. 3 represents a flow chart of a process for a computing system to select a visual display component for interacting with a data set. The process may begin in step 300, for example, from a user initiated command communicated through a user interface of a computing system. In step 310, the system may provide a library of visual display components having the ability to manipulate data, for example, utilizing an analytic pattern and/or a visual object. In step 320, the system may provide a data set where at least one dimension of the data may be suitably varied. Data sets and/or visual display components may be accessible to the system either explicitly or implicitly. That is, a user may provide explicit input to a user interface for loading a data set and/or a visual display component into the system to be analyzed. Though, in some cases, a data set and/or a visual display component may be readily available by the system and automatically accessed without user intervention whenever an indication is made that a particular a data set and/or visual display component should be employed.

In step 330, an analytic engine of the system analyzes the library of visual display components and identifies which visual display component(s) may be capable of receiving user input for manipulating the data set. In some cases, this analysis may be based on a comparison of the one or more dimensions of the data set to capabilities of the visual display components to accept, through a graphical user interface, user input specifying variation along those dimensions. In some embodiments, a comparison of aspects of the data set and a visual display component may involve analyzing whether a visual display component can support different types of variation appropriate for certain dimensions of data. Various dimensions of data may take on certain forms, such as for example, continuous data, discrete data, enumerated data presented as a list of choices, data kept within a particular boundary-defined range, or combinations thereof. By analyzing the data and the visual display component(s), comparisons may be made through a combination of exact and inexact modeling, where not all dimensions or values within a possible range of a data set may necessarily match with every aspect of a visual display component. From this matching process, visual display components may be scored and ranked based on how closely visual display components may match with the data set.

In step 340, the system proposes the identified visual display component(s) as one or more suggestions to the user for how data corresponding to dimensions of the data set may be manipulated. Visual display components may be proposed by any suitable method, for example, through a graphically interactive display of a user interface. For instances where a plurality of visual display components are proposed on a graphically interactive display of a user interface (e.g., on a menu), visual display components may be proposed according to a ranked order where visual display components that more closely match the data set are suggested before visual display components that less closely match the data set.

In step 350, the system may receive a user input selecting a visual display component of the one or more proposed visual display components. In step 360, the visual display component is implemented for at least one dimension of the data set to be suitably manipulated. Implementation of the visual display component for manipulating the data set may involve data connectors of the visual display component that are connected to the data set. In some embodiments, the visual display component is provided on a graphical user interface for a user to interact with the data set through the visual display component. The flow chart process ends in step 370 upon termination of the process for selecting a visual display component, or ending execution of the visual display component for manipulating the data set.

As discussed above, a proposed visual display component for receiving input to interact with a data set may include an analytic pattern. As an example, a visual display component incorporating an analytic pattern may operate on a set of real estate data and, when executed, provide an output as an interactive tour of potential sites selected with a goal of displaying sites suitable for starting a business according to interests provided by a user. Or, another analytic pattern of a visual display component may allow a user to visualize how the distribution of types of businesses in a particular neighborhood will vary when the percentage of another type of business changes. Accordingly, application of an analytic pattern through a visual display component may result in a visualization and/or manipulation of data that provides for a highly interactive and intuitive user experience.

Visual display components having one or more analytic patterns for processing data may be pre-packaged and available through a user interface for a user to select. Analytic patterns in a visual display component may be pre-defined, however, in some embodiments, a user may create a visual display component having a suitable analytic pattern to which data is input and a result produced based on an evaluation of at least one of an equation, rule, constraint or expression. Based on output resulting from the analytic pattern executed, a user may input one or more updates to the analytic pattern and/or the data through the visual display component where the analytic pattern is re-run to yield a modified result. In some cases, application of the analytic pattern of the visual display component to a data set may modify items of data in the data set where the analytic pattern may or may not be re-run based on the data modification.

Though visual display components may be selected based on user input, the functionality and utility of data analysis systems may be expanded by incorporating into a computing system components that can select and apply one or more visual display components, such as those containing analytic patterns characterizing data to be provided to a user in the user's context and also characterizing the interactions between the data and user. In response to an input identifying user context, the system may identify a visual display component having an analytic pattern to apply in generating information for the user, and to handle further interactions between the user and the information (as the user seeks to better understand the information or subsets of the information, including by providing more data).

Once a visual display component is selected, an execution engine may apply an analytic pattern of the visual display component to generate information. A visual display component may include one or more elements, at least some of which define a computation to be performed based on data indicated as providing an input to the visual display component. This information may be provided to a user through a display, though the results of execution of a visual display component may be used in any suitable way, including influencing output generated by another component or altering a subset of data that has been selected for analysis.

In some embodiments, the computation may be based on an equation represented in an analytic pattern of the visual display component. The equation may specify a mathematical operation to be performed on data that is dynamically identified by user input. Such a mathematical operation may include other data, such as user data obtained from a user profile or based on context information.

For example, an analytic pattern of a visual display component may include an equation, defining computation of calorie content from a recipe. Such an analytic pattern may be selected by a user, for example, when analyzing data representing recipes such that, in addition to receiving data representing these recipes, a user may receive calorie content. In some embodiments, an analytic pattern of a visual display component may contain declarative statements that are conditionally executed. Such declarative statements, for example, may specify additional sources of information that may be accessed to apply an analytic pattern. For example, a visual display component, when executed, may acquire data from which calorie content may be determined.

As another example, a visual display component may include an analytic pattern having a formula for computing commuting distance or time from a location. Such a visual display component may be selected by a user, for example, when analyzing data on houses for sale such that, in addition to receiving a listing of houses for sale, a user may receive commuting information for each house.

As yet another example, a visual display component may include an analytic pattern having a formula for generating a metric comparing a patient's lab results to a population norm. Such a visual display component may be selected by a user, for example, analyzing data obtained over an intranet in a hospital such that a clinician may receive, in addition to lab results for a patient, comparative data characterizing the results based on an analysis of lab results in medical records for other users treated in the facility. The visual display component may enable the clinician to do what-ifs like change some assumptions about the patient or the relationship between lab data and underlying disease. In another example, a visual display component may enable an interaction with a user that seeks to determine a desirable site for purchasing a house to change a general location for the potential purchase. Upon receiving input of the change in location, the visual display component interacts with the data to output updated suggestions according to the what-if inquiry input by the user for determining an optimal site for purchasing the house. Or, in generating a meal plan for the week, a visual display component may take an input regarding a limit to the number of calories for a user to intake and, accordingly, the visual display component may interact with the data to adjust the meal plan for presentation through a display.

Besides equations and/or formulae, an analytic pattern of a visual display component may also comprise other types of statements, such as constraints and/or rules. Also, the application of a visual display component in a data analysis system may additionally or alternatively trigger other actions to be performed besides the generation of information to be returned to the user. Such actions may be conditionally performed based on satisfaction of a constraint in the analytic pattern or based on the evaluation of a rule in the analytic pattern. In some cases, an execution engine of a system may apply an analytic pattern of a visual display component to a data set for manipulation of the data set where items of data are altered, removed and/or added to.

A data analysis system may contain multiple visual display components, applicable in different contexts. Accordingly, a data analysis system may contain a component that selects a visual display component for a specific context. A component to perform this function may access a visual display component library, from which a user or component of the system may select one or more visual display components.

To facilitate the use of visual display components, analytic patterns in the visual display component may be represented as a collection of declarative statements ("expressions").

An expression is a symbolic representation of a computation to be performed, which may comprise operators and operands. The operators of an expression may include any operators known to one of skill in the art (such as the common mathematical operators of addition, subtraction, multiplication, and division), any functions known to one of skill in the art, and functions defined by a user. The operands of an expression may include data (such as numbers or strings), symbols that represent data, and other expressions. An expression may thus be recursive in that an expression may be defined by other expressions.

A symbol may represent any type of data used in common programming languages or known to one of skill in the art. For example, a symbol may represent an integer, a rational number, a string, a Boolean, a sequence of data (potentially infinite), a tuple, or a record. In some embodiments, a symbol may also represent irrational numbers, while in other embodiments, symbols may not be able to represent irrational numbers.

For example, an expression may take the form of a symbolic representation of an algebraic expression, such at $x^2+2xy+y^2$, where x and y may be symbols that represent data or other expressions. An expression may take the form of an equation, such as $E=mc^2$, where E, m, and c may by symbols representing data or other expressions. An expression may take the form of a function definition, such as $f(x)=x^2-1$, where $f$ is a symbol representing the function, x is a symbol representing an operand or argument of the function, and $x^2-1$ is an expression that defines the function. An expression may also take the form of a function invocation, such as $f(3)$, which indicates that the function $f$ is to be invoked with an argument of 3.

Expressions may be solved by an execution engine to produce a result. For example, where the symbol x (itself an expression) represents the number 3 and the symbol y (also an expression) represents the number 2, the expression $x^2+2xy+y^2$ may be solved by replacing the symbols with the values the represent, e.g., $2^2+2\times 2\times 3+3^2$, and then applying the operators to the operands to solve the entire expression as 25. In another example, where m is a symbol representing the number 2 and c is a symbol representing the number 3, the expression E, defined above, may be solved by replacing E with its definition, e.g., $mc^2$, replacing the symbols m and c with the values they represent, e.g., $2\times 3^2$, and applying the operators to the operands to solve the expression as 18.

In evaluating an expression, the execution engine may apply the operators to the operands to the extent that the operators and operands are defined and to the extent that expression engine knows how to apply the operators to the operands. For example, where the symbol x represents the number 3 and the symbol y is not defined, the expression $x^2+2xy+y^2$ may be solved by replacing the known symbols with the values the represent, e.g., $2^2+2\times 2\times y+y^2$, and then applying the operators to the operands to solve the entire expression as $4+4y+y^2$. Where the symbol x represents the number 3 and the symbol y represents the string "hello", the expression $x^2+2xy+y^2$ may be solved as $4+4\times hello+hello^2$, since the expression engine may not know how to perform arithmetic operations on the string "hello."

In some embodiments, expressions may be declarative. A declarative expression may indicate a computation to be performed without specifying how to compute it. A declarative expression may be contrasted with an imperative expression, which may provide an algorithm for a desired result.

In some embodiments, expressions may be immutable. An expression is immutable if it cannot be changed. For example, once a definition is given, such as $E=mc^2$, the expression E cannot later be given a different definition. One advantage of immutability is that applications defined by immutable expressions may be side-effect free in that the functionality of the application may not be able to be altered by users of the application.

A visual display component may be defined by a set of expressions that collectively specify an analytic pattern. A visual display component defined by expressions may have input variables and output variables and the relationship between the input variables and the output variables may be defined by the set of expressions. In solving for the output variables, the expression engine may produce data (e.g., a number or a string) or may produce an expression of the input variables.

In this way, the visual display components may be relatively easy to produce and apply. Further, by having visual display components applied in an execution engine, an entity providing visual display component execution services may receive visual display components from third parties and apply them in any suitable environment. Furthermore, by allowing in the data analysis system the contribution and application of visual display components from third parties, the data analysis system is able to leverage the expertise of subject matter experts who may have specific knowledge pertinent to particular types of data analyses.

To facilitate the authoring and contribution of visual display components by third parties, the data analysis system may provide an authoring tool with a user interface that allows an author to create a visual display component suitable for receiving user input to vary an aspect of the data set. In some embodiments, visual display components are represented in a format that allows a user to simply create or edit a visual display component by entering a set of declarative statements. The declarative statements may be in a format that would not require computer programming expertise. The authoring tool may execute in the data analysis system itself and/or on a client system. As a result, knowledge useful in generating data analysis and modification results may be captured in visual display components and shared across data analysis systems.

Figure 4:
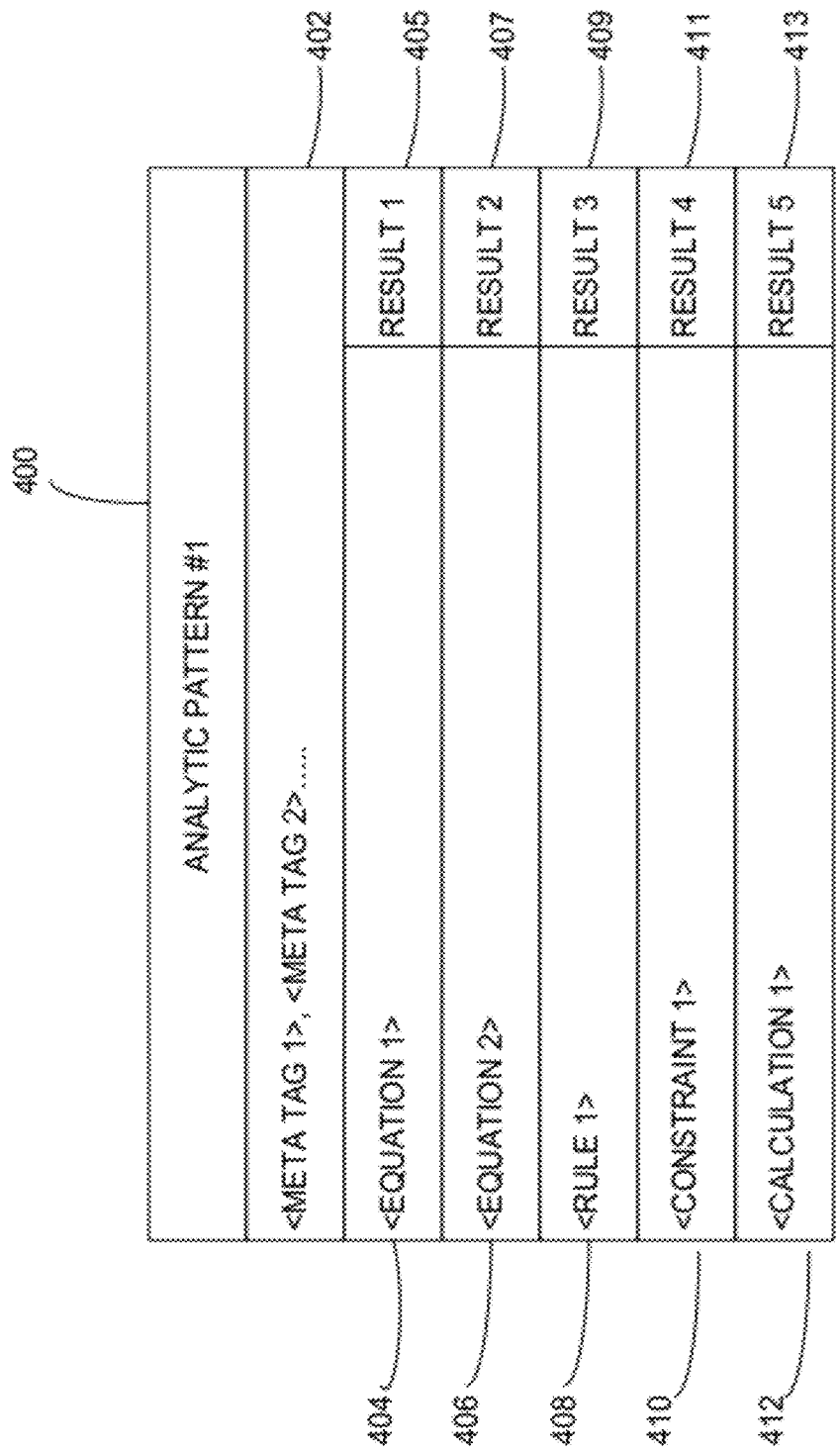
FIG. 4 is a diagram of types of statements that may comprise the specification of a declarative model.

FIG. 4 is a sketch of a data structure that may be used to define an analytic pattern 400, such as one contained in a visual display component selected from a store of visual display components 220 of FIG. 2. Analytic pattern 400 may be stored in any suitable way. In some embodiments, it may be stored in a file. Accordingly, in such embodiments, like other web pages, analytic pattern 400 may include meta tags 402 to aid in indexing the analytic pattern in any suitable way.

Analytic pattern 400 may comprise one or more elements, which in the embodiment illustrated are statements in a declarative language. In some embodiments, the declarative language may be at a level that a human being who is not a computer programmer could understand and author. For example, it may contain statements of equations and the form of a result based on evaluation of the equation, such as equation 404 and result 405, and equation 406 and result 407. An equation may be a symbolic or mathematical computation over a set of input data for manipulation of the data.

Analytic pattern 400 may also comprise statement(s) of one or more rules, such as rule 408 and the form of a result based on evaluation of the equation, such as rule result 409. The application of some types of rules may trigger an action, such as having a search to be performed, thereby collecting new information or displaying a result in a specified graphical format. According to some embodiments, when an analytic pattern 400 of a visual display component containing a rule, such as rule 408, is applied, such as by an execution engine, the evaluation of the rule performed as part of the application of the visual display component initiated by the system having received an input to execute the visual display component may generate a suitable result, such as a data manipulation. For example, a rule may be a conditional statement and a result that applies, depending on whether the condition evaluated dynamically is true or false. Accordingly, the result portion of a rule may specify actions to be conditionally performed or information to be displayed or any other type of information.

Analytic pattern 400 may also comprise statement(s) of one or more constraints, such as constraint 410 and result 411. A constraint may define a restriction that is applied to one or more values produced on application of the analytic pattern. An example of a constraint may be an inequality statement such as an indication that the result of applying an analytic pattern to a data input. A result 411 may similarly be associated with constraint 410 to define an action conditionally taken or a result displayed based on evaluation of the constraint.

Analytic pattern 400 may also include statements of one or more calculations to be performed over input data, such as calculation 412. Each calculation may also have an associated result, such as result 413. In this example, the result may label the result of the specified calculation 412 such that it may be referenced in other statements within analytic pattern 400 or otherwise specifying how the result of the computation may be further applied in generating information for a user. Calculation 412 may be an expression representing a numerical calculation with a numerical value as a result, or any other suitable type of calculation, such as symbolic calculations. In applying analytic pattern 400 to a data input, an execution engine may perform any calculations over the data that are specified in the analytic pattern, including attempting to solve equations, inequalities and constraints over the data input. In some embodiments, the statements representing equations, rules, constraints or calculations within an analytic pattern of a visual display component may be interrelated, such that information generated as a result of one statement may be referenced in another statement within analytic pattern 400. In such a scenario, applying analytic pattern 400 may entail determining an order in which the statements are evaluated such that all statements may be consistently applied.

In some embodiments, applying an analytic pattern may entail multiple iterations during which only those statements for which values of all parameters in the statement are available are applied. As application of some statements generates values used to apply other statements, those other statements may be evaluated in successive iterations. If application of a statement in an iteration changes the value of a parameter used in applying another statement, the other statement will again be applied based on the changed values of the parameters on which it relies. Application of the statements in an analytic pattern may continue iteratively in this fashion until a consistent result of applying all statements in the analytic pattern occurs from one iteration to the next, achieving a stable and consistent result. Though, it should be recognized that any suitable technique may be used to apply an analytic pattern 400.

Figure 5:
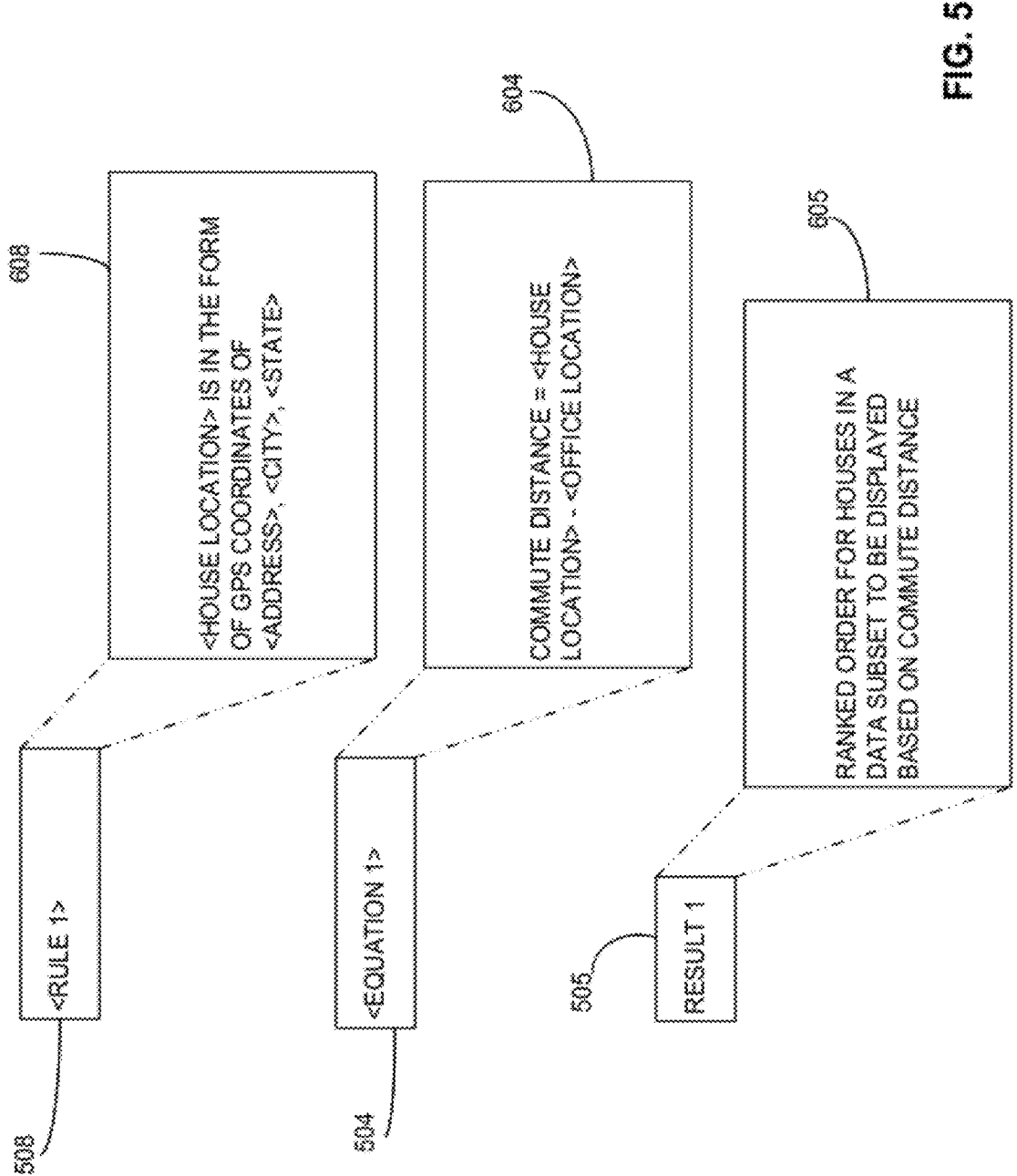
FIG. 5 is a diagram of an example of statements, such as those that may be specified for the declarative model of FIG. 4.

FIG. 5 provides an example of statements such as those that may be specified for analytic pattern 400. In the example of FIG. 5, a visual display component having an analytic pattern may be selected and applied when a user is performing a house search, and may in this example, relate houses for sale to the user's commute. Application of the visual display component having an analytic pattern in the example of FIG. 5 may generate information on the commuting distance and/or time between each house for sale and the user's office location. The visual display component, when executed, may also process the retrieved data to output a suitable result on a user interface. Thus, rule statement 508 is an example of rule 408 from FIG. 4 that specifies the form of a house location to be used as part of the analytic pattern computations. In this example, rule statement 508 specifies that a parameter, identified as a house location, be in the form of global positioning system (GPS) coordinates of the address, city and state of the house for sale. These parameters may, when the visual display component is applied, be given values by an execution engine based on input data. In this example, rule 508 may evaluate to true when an item of input data contains information that is recognized as a house location by application of rule 508. Accordingly, rule 508 may be used to identify items of data for which other statements within the visual display component are applied.

Equation statement 504 is an example of equation 404 of FIG. 4 that provides a computation to be performed to arrive at the commute distance, based on the location of the house for sale as specified in rule statement 508 and a value that may be available to the execution engine, which in this example is indicated as the office location. In this example, the office location is an input parameter to the model that may have been provided as part of a user profile or user context. The house location, however, is based on the application of rule statement 508, received from another input to the visual display component, such as data from data source 210.

Result statement 505 is an example of result 405 of FIG. 4 that specifies how to display the result of the computation performed for equation statement 504. Thus, result statement 505, in this example, specifies a ranked order of priority for houses in a data subset to be displayed based on a commute distance, which is a parameter for which a value may be established based on data input. In some cases, the original data set input into the visual display component may be modified based on the values output by the analytic pattern, for example, to incorporate the ranked order of priority for houses in the data set for the user.

The example of FIG. 5 illustrates some of the statements that may be present in an analytic pattern of a visual display component to display results from a user query. In this example, the results relate to houses for sale. The analytic pattern of the visual display component may be applied by an execution engine to every item of data in input data. Though, not every input item of data may comply with rule 408 or other conditions established by statements within the analytic pattern. In the simple example of FIG. 5, a value of a parameter called "commute distance" is computed by an execution engine upon application of the analytic pattern of FIG. 4.

It is not a requirement that a visual display component proposed through a user interface for receiving input to process data within a data set to produce a specific numeric output. For example, a visual display component having an analytic pattern encoded therein may produce an ensemble of data according to a set of equations, declarative models, rules and/or constraints. In an embodiment, it may be desirable to generate a number of suggestions to complement a particular item, for example, articles that go with a flat screen television in creating a home theater environment. As such, a user may select an appropriate visual display component that takes as input a large data set of potential articles for a home theater (e.g., obtained through a web search or read from a database). Once the data set is connected to the visual display component, an execution engine may apply an analytic pattern reflected by the visual display component to process the data and generate suggestions to the user for appropriate items that complement the flat screen television of interest to be acquired. For example, the visual display component, having employed the analytic pattern, may identify one or more supplemental home theater devices, such as a recording device or sound amplification system. As a result, the home theater devices, in combination, may produce an appropriate ensemble of items to accompany the flat screen television. In some cases, various factors, such as price range, items the user already has, space available for the home theater set, and/or other appropriate considerations may be inputs connected to the visual display component and are figured into the calculus of the analytic pattern.

A data set having dimensions where a system may manipulate the data set to produce an ensemble of data may be appropriately matched with a visual display component having an analytic pattern for generating a suggested ensemble of data from the data set. Accordingly, a computing system may analyze a data set and a visual display component that can be applied to a data set in a manner that modifies at least one dimension of data in the data set to propose the visual display component on a user interface for potential selection of the visual display component from receiving a user initiated command.

In some embodiments, an analytic pattern of another visual display component may process a data set input according to a set of equations, declarative models, rules and/or constraints to result in a minimization of one or more characteristics of the data set, suiting a particular set of user preferences. In one embodiment, a user looking for a place to live may have a number of preferences, for example, a location or type of place. For instance, a user may prefer to live in close proximity to a place of work, school or a gym. In addition, the user may have a preference for particular locations he/she would like to visit in accordance with a particular sequence (e.g., a preference to leave home to go to work, school, and subsequently the gym, in that order). Accordingly, one or more visual display components may be analyzed by the system, proposed to a user and appropriately selected based on whether the visual display component(s) are capable of receiving input for manipulating the available data. Based on information connected to the selected visual display component of the available places of residence in a town or neighborhood, application of the analytic pattern in the visual display component may process the data input into the visual display component and generate a ranked list of proposed residences that are located a minimal distance from user-preferred places.

Or, application of an analytic pattern of a different selected visual display component may prioritize a number of potential places of residence for a user having a preference for the user to minimize his/her carbon impact on the environment, ahead of cost considerations. Accordingly, execution of the visual display component may generate a ranked list containing potential homes within walking distance from certain locations of importance (e.g., work, school, gym), over those within driving distance. This ranked list may be provided to a user as an output or may be further used in defining an output. In some cases, the data set may be modified to incorporate a prioritization of items of data in accordance with the ranked list. Based on the ranked list of potential homes, for example, an analytic workbench may produce and propose a map for display through a user interface to a user of a plurality of potentially desirable locations for the user to live. For example, when a user seeks to analyze housing data for a neighborhood where a number of potentially desirable homes are located, the user interface may take the user on a visually interactive "tour" of what places the user should consider, in accordance with the applied analytic pattern of a visual display component.

A data set having dimensions where certain dimensions of data may be minimized may suitably match with a visual display component having an analytic pattern for minimizing certain characteristics of a data set. Thus, a visual display component that an analytic engine determines to be a close match to the data set can be proposed on a computing device through a user interface for potential selection, where the visual display component may appropriately modify at least one dimension of data in the data set according to a preference of a user.

In some embodiments, the analytic pattern of a selected visual display component may be implemented as a set of equations, declarative models, rules and/or constraints to generate a proposed plan or schedule of events to occur. For example, where a data set input into the visual display component includes items that represent a number of action items and/or future events, the system may propose a visual display component having an applied analytic pattern that outputs an appropriate sequence for the items or events to be performed. Or, in an embodiment, an analytic pattern may generate an output of a proposed schedule of events to occur at specified times.

In some embodiments, an analytic pattern of a selected visual display component may maximize a score representing the merit of a collection of items in a data set. This analytic pattern may be represented as a set of equations, declarative models, rules and/or constraints. As an example, the shuttle launch agency of NASA may require decisions to be made regarding which satellites are to be launched and in what order over a 5 year period. A number of factors may figure into such a plan, for example, scheduling reasons for why launches would be required to occur at particular times. Other factors may also be considered such as the social and/or political impact of such launches. For example, a launch that occurs at a certain time and in a manner which permits astronauts from multiple countries to participate in a joint mission may be a political concern considered through an applied analytic pattern. In some cases, an opportunity for astronauts of different nationalities to cooperate may result in social and/or political benefits that is captured in an analytic pattern of a visual display component to influence analysis and potential modification of dimensions in the data set.

As another example, a user may wish to create a solution for putting together a clothing ensemble or outfit that is in accordance with the latest fashion styles, price and/or other constraints or rules. The clothing ensemble may be assembled from a listing of articles of clothing, for example, those available in a department store. Data on such articles may be acquired from a suitable data source. Using conventional single-valued functions, such as those provided in a spreadsheet environment, to assemble a suitable clothing ensemble may be laborious and difficult for a user to employ, much less visualize through an interactive experience. However, analytic patterns described using appropriately analyzed, proposed and selected visual display components may create a user experience that enables a user, for example, to be presented with a number of visual options for a clothing ensemble in accordance preferences that the user may have. Accordingly, a user may, on a user interface, select a visual display component of a number of suggested visual display components having an analytic pattern that connects to a data set that represents a large number of articles of clothing as an input to the selected visual display component. Through processing of the analytic pattern on the data input, one or more proposed arrangements may be identified and presented to the user through a graphical interface of an analytic workbench. A user may then conveniently adjust the values of parameters that are coupled to inputs of the visual display component. Alternatively or additionally, the user may involve other analysis functions that change the subset of data on which analysis is based. For example, a user may specify one or more constraints on that data. For example, a constraint may restrict the data subset to only contain items in a defined price range. As the values of inputs to the analytic pattern change, the analytic pattern may be re-executed. Accordingly, the visual display component may be applied at levels of abstraction that require multiple parameters and relationships of parameters of data to be changed simultaneously.

A software application, implementing an analytic workbench, may provide a suitable interface for a user to appropriately select a data set for one or more visual display components to operate upon. The software application may analyze the data set and visual display components available in a library of visual display components to determine which visual display components best match the desired operation(s) to be performed on the data set. From a proposed selection of visual display components, the user may then specify the visual display component(s) to be used where, for example, the analytic pattern(s) of the visual display component(s) can appropriately process the data and generate a result. Such a result may be displayed through the user interface, and feedback of the result may be easily and conveniently provided by a user through the user interface.

Any number of analytic patterns may be selected and applied to data in any combination and may be applied in conjunction with other analysis tools. After a suitable analysis, such analytic patterns may be pre-packaged as suggested visual display components for a user to select for appropriate data manipulation. The pre-packaged visual display components may be applied to a specific analysis problem by receiving user input indicating what data is input to the visual display component and how an output generated may influence a presentation of results to the user through an appropriate display interface.

In some embodiments, a visual display component itself may be analyzed and adjusted to suit operation on the data. For example, a system may determine it to be suitable that a visual display component incorporate an additional analytic element (e.g., equation, rule, constraint, expression, etc.) to an analytic pattern of the visual display component. Accordingly, the system may include the additional analytic element within the visual display component and the analytic pattern may be re-executed.

In an embodiment depicted in FIGS. 6-9, an information worker employs a user interface of an analytic workbench having a display region 1000 and a number of visual display components to analyze data for choosing a store site for opening up a business. The user interface provides visual representation(s) of appropriate data in a way that is intuitive for the user. A number of factors will come into consideration for the user in assessing where a suitable location for the business may be, such as for example, what the market potential is based on the location of a potential site of interest and customers located within a particular proximity of that site. One or more of these factors may be expressed as analytic patterns used in making a decision. As such, an analytic engine may evaluate the data available for choosing a potential store site along with a library of visual display components and identify which visual display components will be useful for the user to perform operations on the data (e.g., based on analytic pattern(s) within a visual display component). Based on the data provided, in some embodiments, visual display components may be analyzed in conjunction with the data to present a suggested menu on a user interface for a user to select which visual display component(s) to implement based on a capability for the visual display component(s) to receive input for subsequently processing the data.

FIGS. 6-9 provide screen snapshots of a user interface depicting manipulation of visual elements presented through selected visual display components that appear on the user interface and application of constraints on the data such that subsets of the data are displayed on the user interface. The selected visual display components having been proposed subsequent to an analysis performed on the data and the available visual display components take data as input and may manipulate the data according to an analytic pattern that results in an output of a data analysis or process. In some cases, the visual display component applies a constraint and/or filter to the data and visual object representing the data such that the data does not change, but rather, is presented differently. For example, as the percentage of one business changes in a neighborhood, how the distribution changes of other businesses may affect a person's decision-making process in determining where to open a store. Accordingly, a visual display component programmed with an analytic pattern that represents this relationship may be used. Such a visual display component may be selected and used to process appropriate data according to an analytic pattern, in this example, for the user to be better informed of potential locations for the business. Further, selection of a visual display component through a user input may determine the allocation of businesses in a particular region when the percentage of another type of business is altered.

Figure 6:
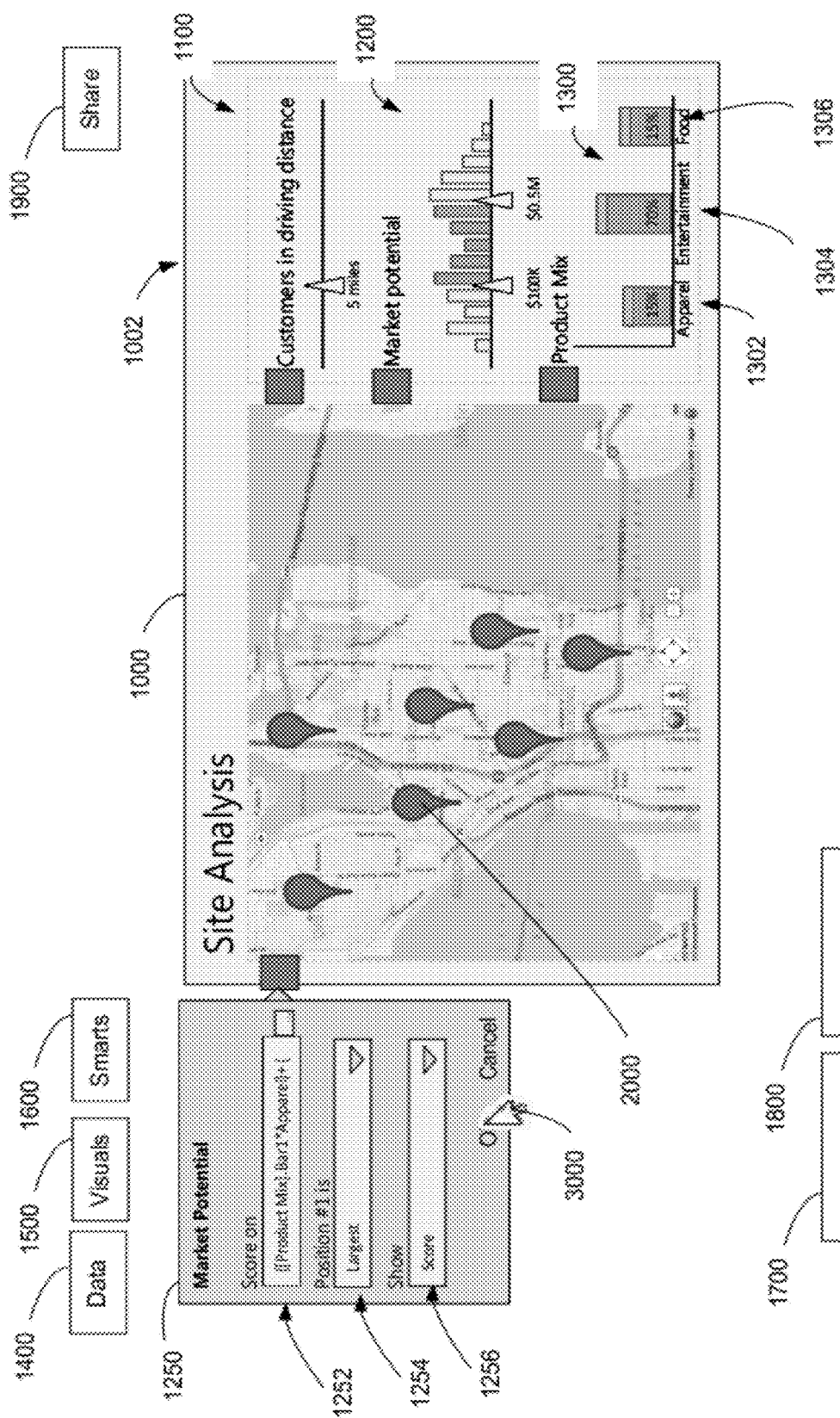
FIG. 6 is an illustrative example of a user interface through which a user is able to apply a visual display component to a visually presented data set.

In this example, display region 1000 of a user interface, shown in FIG. 6, provides a map display for a user to visually assess where potential locations 2000 may be in a city or neighborhood for the user to start the business. In this respect, a processor of the computing device rendering the user interface display has access to a variety of information related to possible locations within the city that may be suitable for the business. Depending on how relevant the information is and what the user indicates his or her preference(s) may be regarding starting of the business, certain items of information may or may not be displayed on the user interface for visual interaction by the user. Indeed, not all of the data accessible to the processor of the computing device will be displayed since much of the information may be extraneous and cumbersome for the user to view. For example, while it may be important for a user to be visually exposed to roads in a neighborhood that lead up to a potential site for the business or what other businesses surround the site, it might not be necessary for the user interface to also display superfluous information such as the current time of day on the display interface.

A visually interactive region 1002 is available on the user interface for the user to input information regarding user preference(s) that filters the data presented on the display region 1000 according to one or more dimensions. In an embodiment, controls 1100, 1200, 1300 are provided in the visually interactive region 1002. Such controls may be implemented using graphical user interface programming techniques as are known in the art. These controls may be manipulated based on user input, which triggers execution of functional modules linked to the control. These functional modules may filter or otherwise constrain the data subset used to generate the display.

In some embodiments, controls 1100, 1200, 1300 are visual display components provided on a user interface where the controls take data having variable dimensions as input and produce one or more visual outputs according to how the data is analyzed and processed.

For example, as shown, a control 1100 is provided as a visual display component to produce an output of a parameter indicating a particular driving distance between a site under consideration and potential customers. The value of that parameter may be adjusted based on user input and, for example, may specify the position of a marker on a slider. Data on customers likely to shop at a store if located at a particular site may be filtered based on a constraint set by adjustment of the marker on the slider.

Another control 1200 may be provided as a visual display component for a different characteristic, market potential in this example, through which a user may further filter information presented on the display region 1000. In the example shown in FIG. 6, a lower bound and an upper bound may be set by the user to determine a range of interest of possible revenue (e.g., between $100,000 and $500,000 in monthly revenue, shown in FIG. 6). Here, heights of shaded bars shown within a range of interest indicate a number location in the data set with the degree of market potential at the particular values indicated. The higher the bar is depicted, the more sites there are that could potentially generate the amount indicated in monthly revenue. Market potential is also shown for a region outside of the revenue range of interest, depicted as unshaded bars. Though, in this example, only data points corresponding to the shaded bars are selected for analysis.

In this specific example, proposed locations 2000 provided in the display of the user interface 1000 reflects locations of available store sites having a market potential within the range of $100,000 and $500,000 in monthly revenue based on customers within a 5 mile driving distance. Accordingly, visual display components provided through controls 1100 and 1200 enable dimensions of data (e.g., driving distance and market potential) to be evaluated and displayed in a visually interactive manner.

In some embodiments, a number of visual display components analyzed and determined by the system to be capable of manipulating the data in a desired manner are initially displayed as a menu of options. A user may select from this menu however many visual display components for implementation through the user interface. For some embodiments, a number of visual display components may be employed simultaneously through the user interface.

For data related to potential sites for starting a business, various dimensions of data may be correlated in ways that are not readily apparent to a user. Lease price, driving distance and market potential may be correlated such that, as the user changes values of filter criteria in each of these dimensions, the number of potential sites meeting the criteria may vary in a way that is not immediately appreciated by a user. For example, a user may initially consider a neighborhood of 100 locations with efforts in mind to meet the user's criteria where the user specifies filter criteria through a visual display component that limits results to locations in the particular neighborhood having a market potential with a monthly revenue over $1,000,000 for customers that are within 2 miles driving distance. In some cases, such criteria may be overly restrictive and return no locations in the neighborhood with a market potential having a monthly revenue over $1,000,000 for customers that are within 2 miles driving distance. In response, the user may relax the filter criteria through the visual display component to include locations having a market potential with a monthly revenue between $100,000 and $500,000 for customers that are within 5 miles driving distance matching the criteria, returning substantially more potential locations to start the business. For example, potential locations 2000 as indicated in FIG. 6 may appear based on the relaxed filter criteria. Further, upon relaxation of the filter criteria even more, additional potential locations may appear as highlighted on the display region 1000. Or, filter criteria may be adjusted such that a different set of potential locations are featured by the display region 1000.

The proposed locations 2000 depicted may be automatically adjusted dynamically on visual display components of the interactive display region 1000, for example, as a user provides input(s) relating to the adjustment regions 1100 and/or 1200. A user can repeatedly adjust parameters of either dimension as many times as desired and view changes in how the items that fall within the adjusted range(s) are distributed. Such a display region 1000 and visually interactive region 1002 with visual display components may help a user visualize ranges of values of each of the dimensions that may serve as filter criteria to generate a filtered set of items of data of a desired size and focus.

A system may provide a user interface to support exploration of filter criteria using any suitable visual display component(s). In some cases, dynamic exploration of filter criteria can be performed by a user through the use of interactive sliders and bar graphs of visual display components. The user can, using conventional techniques for graphical user interfaces, provide input that adjusts the range of a slider, corresponding to a dimension, on an interactive display. The system may dynamically compute from the existing data set and display the distributions of items along one or more dimensions based on the user input. Likewise, conventional interface techniques may be used to specify a value for a bar in a bar graph and display computed results based on that input. Though, it should be appreciated that any suitable interface techniques may be used to receive user input and present to the user results of applying that input. Indeed, the system may analyze what visual interactions are currently available to a user through the system and determine that an additional type of analysis may be useful for the user. Accordingly, the system may propose one or more additional visual display components for the user to potentially implement to operate on various dimensions of the data set through the user interface. In some cases, once having received a user input, the visual display component suitably changes dimensions of variability in the data set.

Interactive features may be provided in the user interface and may be manipulated through any suitable input method, such as for example, with a pointer 3000 positioned by user operation of a mouse. For example, aspects of the user interface may enable a user to determine what data is made available and presentable through the user interface as well as how the data is visualized. The user may select one or more suitable analytic patterns for manipulating data by an operation performed according to the analytic pattern. As will be discussed further below, for the example provided, an analytic pattern provided through a visual display component may include calculations that allocate how certain types of businesses will be distributed as one of them changes in a certain region.

Any suitable data set may be presented as input to the analytic workbench executing on the computing device. In the example of FIGS. 6-9, a data set labeled "Consumer Expenditure" 1700 is selected originating from a source entitled "MyLocations" 1800. The data set may be appropriately loaded into the computing device and items of the data set may be viewed in any suitable format. Items of data may have appropriate supplemental information, such as for example, location, address, images, notes regarding the location and the agent representing the location.

Shown in FIG. 6, the "Market Potential" box 1250 provides a non-limiting embodiment of a selected visual display component having been analyzed and proposed as to its ability to manipulate data based on a user input that defines how control 1200 may be customized. "Market Potential" box 1250 includes a "Score" region 1252 which provides the user with the ability to input into the computing device how to assign scores to each of the potential locations 2000, for example, based on the data. "Market Potential" box 1250 also includes a "Position" region 1254 where a user may determine, for example, that potential locations associated with higher scores be depicted on the display map to be larger than potential locations having lower scores. The "Show" region 1256 allows the user to determine that each potential location displayed on the user interface indicate the market potential score assigned to that location. In some cases, the visual display component may manipulate the data to incorporate corresponding scores and rankings assigned to each location.

Based on the input provided in the "Market Potential" box 1250, the user may readily view what the score is for each ranked location, and can make a determination as to what general regions displayed on a map may be more suitable for starting the business. For example, if the user seeks to open up a clothing store, potential locations near other apparel stores may be readily displayed on the user interface to have, on average, higher scores than other potential locations considered.

Figure 7:
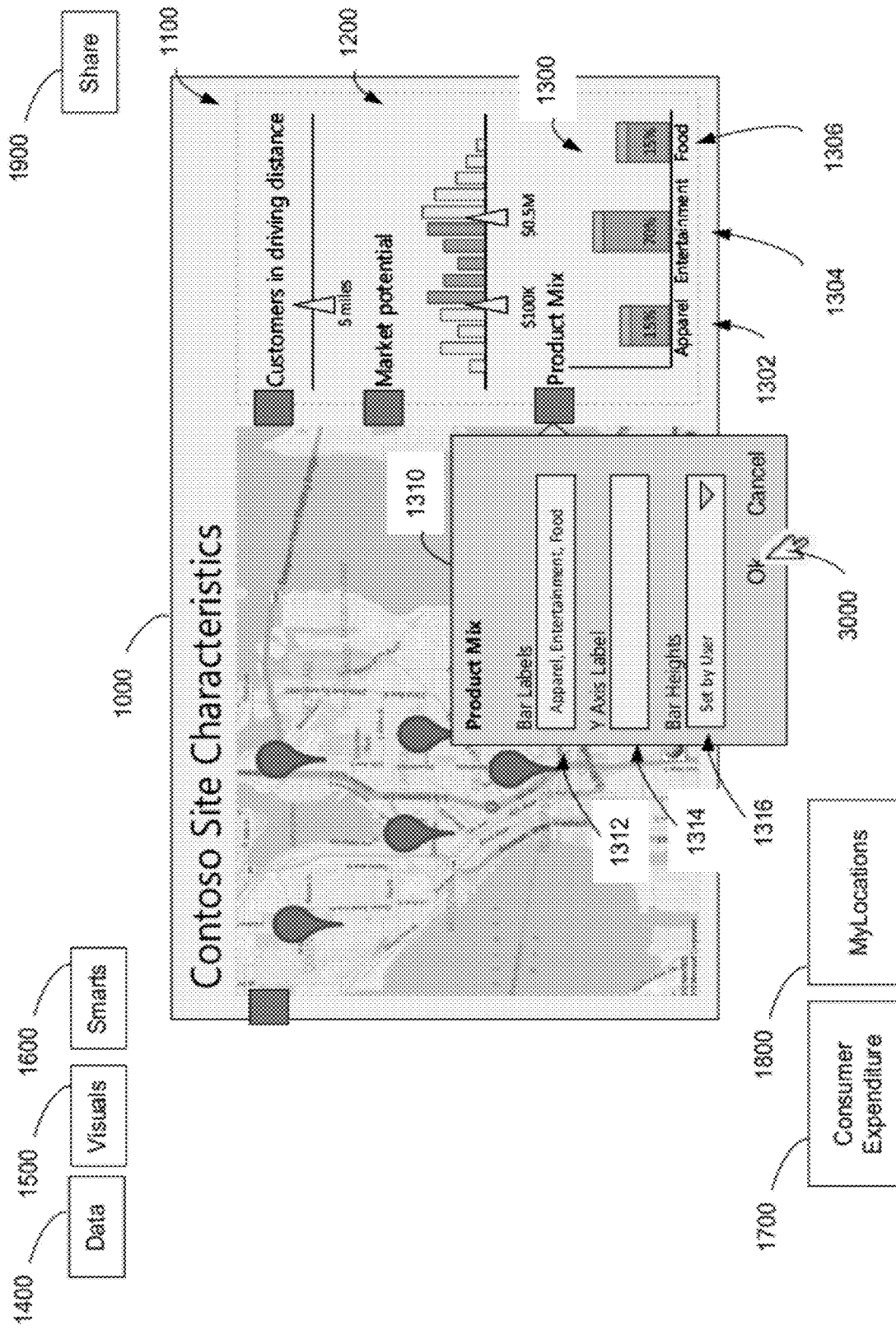
FIG. 7 is an illustration of the user interface of FIG. 6 through which the user is able to apply another visual display component to the visually presented data set.

FIG. 7 shows a customization of control 1300 with another selected visual display component from a number of available visual display components. In this example, the user determines how data should be presented in control 1300. Accordingly, the user manipulates features of a visual display component provided as "Product Mix" box 1310 to create a "Product Mix" control 1300 as another visual display component selected from a number of available visual display components that presents information in the form of a bar graph that represents the distribution of product types that are sold within a particular locale. "Product Mix" box 1310 provides a number of features that allow the user to adjust how parameters in the "Product Mix" control 1300 are presented. For example, "Product Mix" box 1310 includes a "Bar Labels" region 1312 for the user to label bar graphs as "Apparel", "Entertainment" and "Food." The "Y Axis Label" region 1314 permits the user to label the Y axis of the bar graph, however, for the example provided, the "Y Axis Label" region 1314 is left blank. In the example, the "Bar Heights" region 1316 is determined to be set by the user, such as by input indicating a bar height. Accordingly, the "Product Mix" region 1300 illustrates a distribution of various types of products that may be sold in the store for which a site is being sought.

As shown in FIG. 7, "Product Mix" control 1300 includes a bar 1302 representing the percentage within the geographical region of interest that sells apparel to be 15%; bar 1304 that illustrates the percentage within the geographical region of interest that is focused on entertainment to be 70%; and the bar 1306 represents the percentage within the geographical region of interest that sells food is 15%.

Figure 8:
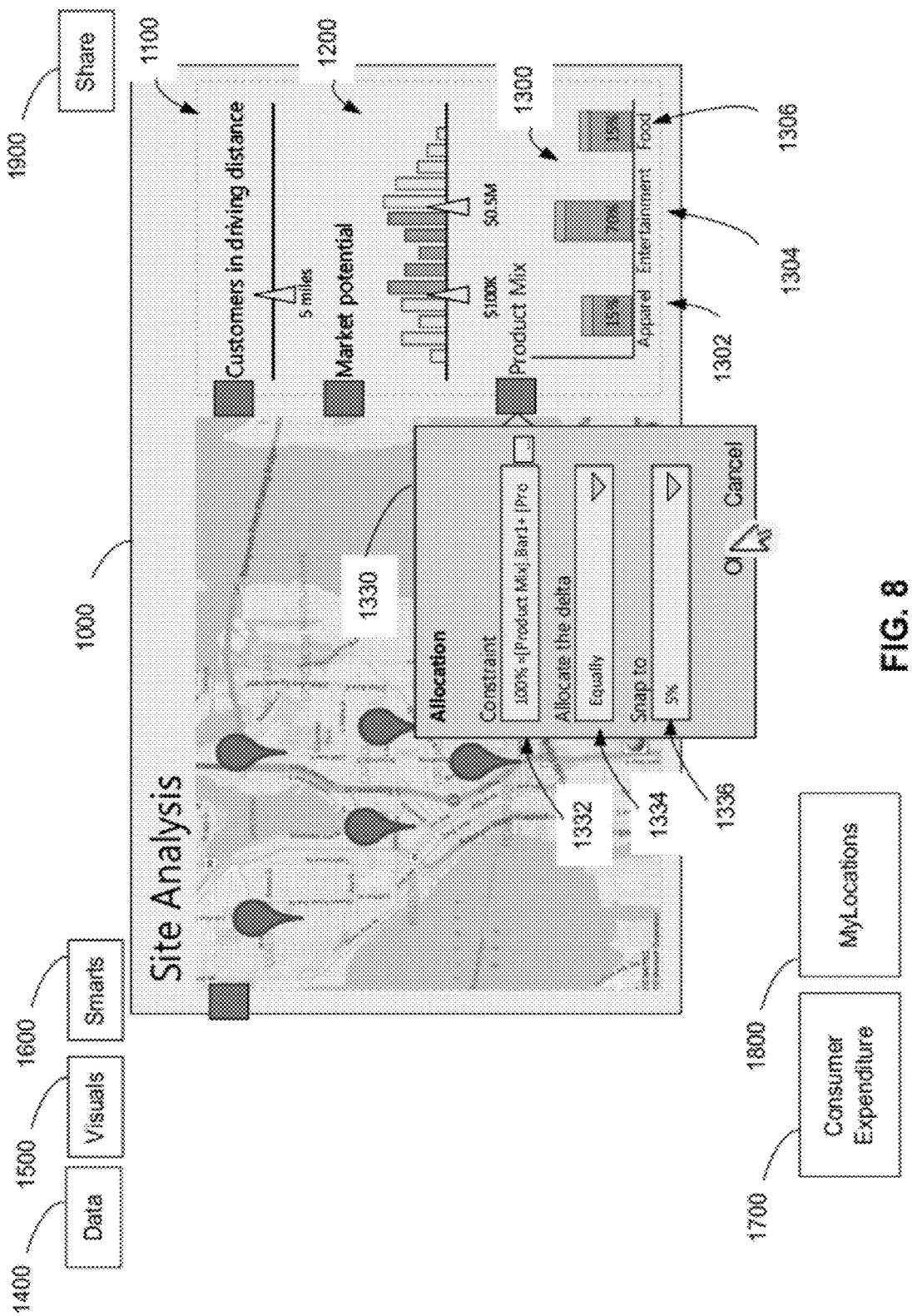
FIG. 8 is an illustration of the user interface of FIG. 7 where the user applies a visual display component having an analytic pattern to the user interface.

As discussed above, in some embodiments, visual display components may have analytic patterns to apply a higher, more abstract level of data processing and interaction with the user. As shown in FIG. 8, "Allocation" box 1330 is provided as another visual display component, selected from a number of visual display components proposed based on its capability of receiving input to manipulate data, where the user can define aspects of the analytic pattern. In an example, the user has specified, based on input in the "Constraint" region 1332, that the allocation should add up to 100%. When the analytic pattern of this selected visual display component is executed, conditional actions may be taken if the constraint is not met. For example, the expression indicated in the "Allocate the Delta" region 1334 may be executed to change the allocation. Here, the "Allocate the Delta" region 1334 has been set by the user to indicate that the difference between the sum of the allocations and 100% should be divided equally over all allocations. The "Snap to" region 1336 defines another equation that can be executed when the visual display component is executed. Here, that equation provides a computation by which each allocation should be rounded to 5% of the actual percentage.

Figure 9:
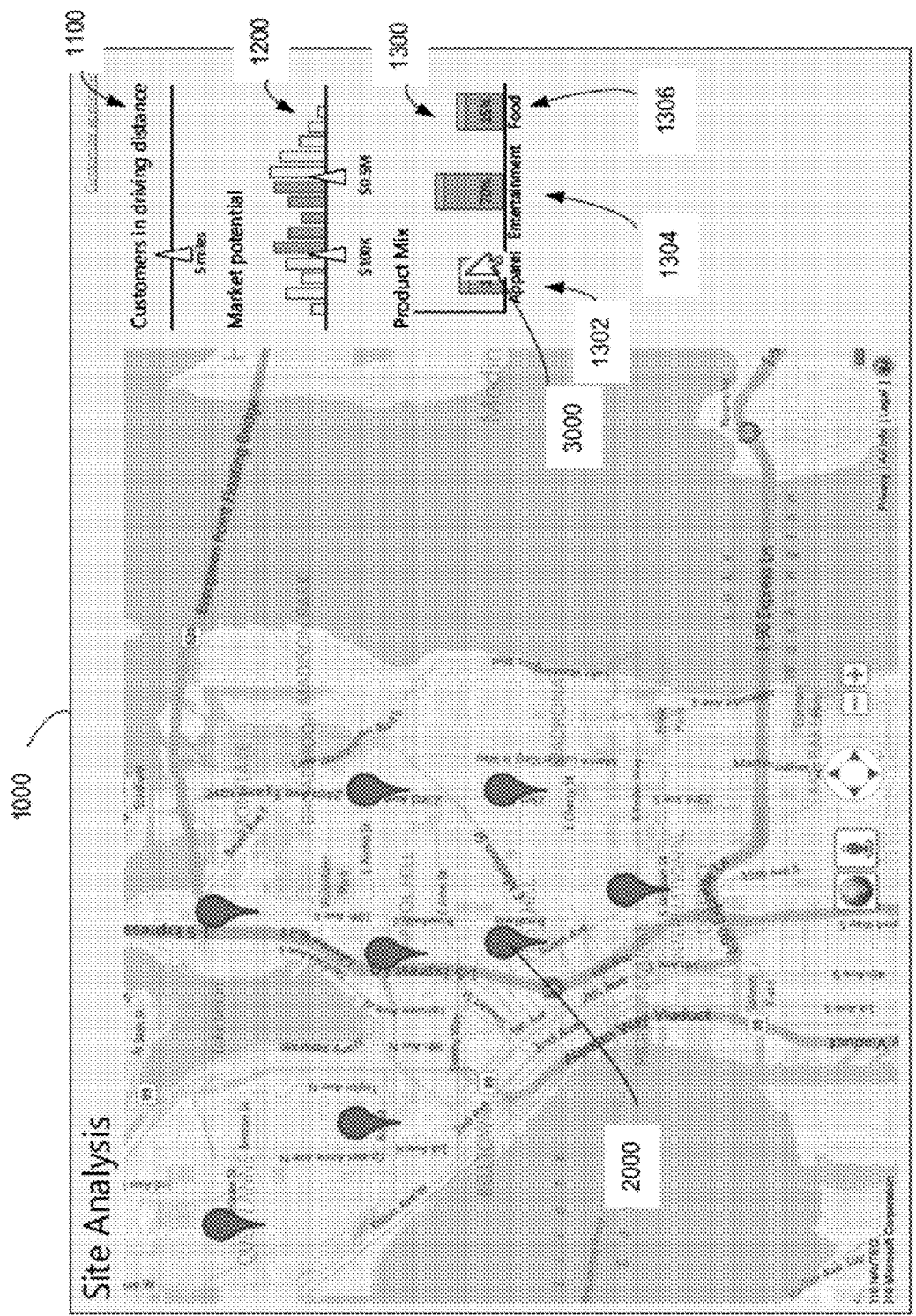
FIG. 9 is an illustration of a user interface that provides for a user experience based on application of the visual display component having an analytic pattern to data.

As a result of the selected visual display component, the associated analytic pattern initiates an interactive experience to be dynamically visualized through the user interface, incorporating the data and controls previously selected. Upon initiation of the user experience, FIG. 9 shows a user interface display 1000 where the user is readily able to view potential locations 2000 that fit within criteria for where the user could start a business. Accordingly, through application of the analytic pattern(s) of the selected visual display component, the interface allows the user to dynamically manipulate one of the bars 1302, 1304, 1306 of "Product Mix" control 1300. When one of the bars 1302, 1304, 1306 is raised or lowered, based on the constraint(s) set by the "Allocation" analytic pattern, the other two bars will dynamically change. For example, if pointer 3000 raises the apparel bar 1302 to 35%, because the "Allocate the Delta" region 1304 was set to equal, the entertainment bar 1304 and food bar 1306 will be lowered equally, by 10% each. Further, because the "Snap to" region 1306 was set to 5%, the apparel bar 1302 is raised to a value that is a multiple of 5%, hence 35%, rather than, for example, 33%. As each of the bars 1302, 1304, 1306 are manipulated, the visual display component may also manipulate the data corresponding to indications provided by the bars.

As one of the bars 1302, 1304, 1306 is raised or lowered, the display of potential locations 2000 on the displayed map may also change accordingly. For example, if the percentage of apparel in a neighborhood is raised from 15% to 35%, the likelihood that a clothing store will be successful in the neighborhood will increase. Accordingly, more potential locations 2000 will dynamically appear on the displayed map by virtue of the apparel bar 1302 being raised through the user interface. Conversely, if the apparel bar 1302 is lowered, then it is likely that the number of potential locations 2000 displayed on the map will decrease.

In this example, a visual display component may be preconfigured to present an analytic pattern associated with using a bar graph style control, such as control 1300. A visual display component may be customized by user input selecting or inputting expressions that define the analytic pattern. A visual display component can also be customized by connecting it to data sources. In this example, data such as the value of each allocation is connected to the visual display component. It should be appreciated that for other visual display components, other types and sources of data may be connected.

An example of another type of visual display component, not expressly depicted, is one that proposes to the user a number of potential locations to the user in accordance with a ranked listing of sites determined by the analytic pattern(s). Accordingly, the visual display component provided on a user interface may step through the ranked listing for the user to view each of the proposed locations in successive order. The visual display component may then alter items of data in the data set to reflect the ranked listing of potential business sites.

Moreover, visual display components may be used together to achieve even more complex functions and/or data manipulation. Visual display components may be applied in a feedback loop where if a visual display component changes data that impacts results of application of another visual display component, for example, the impacted visual display component may be re-executed. As such, the "Allocation" analytic pattern may be used in combination with another analytic pattern. For example, by manipulating the overall distribution of products sold in a particular location using the "Allocation" analytic pattern, a different analytic pattern that prioritizes potential locations may dynamically modify the rankings of potential locations such that corresponding data is updated and/or added, resulting in the display of potential locations 2000 to vary accordingly. For example, if the percentage of apparel stores increases in a region, the ranking potential for a location to be a clothing store in that particular region may also increase. Accordingly, the system may analyze the data and available visual display components and subsequently suggest a combination of visual display components that may provide desirable results.

In other embodiments described herein, a visual display component may include a graphical object having a number of visual characteristics having the capacity to represent data as a visual display. The graphical object may represent a data set through a mapping of dimensions of the data set to visual characteristics such that values in certain dimensions alter the appearance of the visual characteristics. Such a visual display component may provide for the ability to use an arbitrary graphical object as a foundation for which aspects of a data set may be imported into characteristics of the graphical object for suitable visualization of the data. Indeed, visualizing data through separately created graphical objects may provide for more interesting presentation of the data while not being limited to conventional approaches.

In addition to visually representing data, the visual display component may also receive user input resulting in a modification of one or more dimensions of the data. Prior to implementation, visual display components may be analyzed and proposed for selection through a user interface according to whether they are able to modify data based on a suitable input.

In some cases, a system may analyze the data and make an assessment as to which visual display components that include graphical objects for visually representing the data and manipulating the data may be matched to the data. For example, a visual display component, having a graphical object incorporated therein, that is configured to receive user input indicating a change in a variable dimension of the data may be proposed to a user for inclusion on a user interface. Once selected, a user may suitably interact with the data through the visual display component using an appropriate user interface.

In an example of a graphical object of a visual display component, data relating to sales in the past year of a company may be suitably displayed. This data may have multiple dimensions such as sales per quarter and sales events. Sales information for each quarter could be displayed, for example, through a conventional bar graph that depicts the amount of sales at the end of each quarter. The occurrence of the sales events also could be presented through a conventional graph. However, such a presentation of the data, using separate graphs, may be cumbersome for a user or not visually interesting. As a solution, it may be beneficial for both sets of data to be presented simultaneously together, as one graphical object that may have interesting visual characteristics or multiple characteristics that can be varied to represent values of the data in multiple dimensions. Embodiments of a visual display component may provide for the ability to visually present the data in an intuitive manner using a graphical object having characteristics that enable dimensions of data to be presented through the graphical object.

Data may be presented through a visual display component provided as an appropriate graphical object based on the capacity for the graphical object to represent the data and receiving user input to modify a portion of the data. Such capacity may be determined by a number and type of visual characteristics of the graphical object with associated parameters that can be varied to represent the data, or features of the graphical object that can modify portions of the data. A data set may be represented by such a graphical object if each dimension of the data to be displayed can be matched to a parameter of a suitable type. For example, some dimensions of a data set may take on values that are continuous. A percentage increase in sales, for example, may take on any value. To visually represent percentage sales increases, that dimension of the data set may be mapped to a visual characteristic that has a parameter that may have a value that similarly may be varied continuously, though possibly subject to constraints such as constraints on a maximum or minimum value. For example, a length of an object or density of shading are examples of visual characteristics that may be varied continuously. Other dimensions of data may be of other types, such as being represented by a set of enumerable values, being a range of values, etc. Visual characteristics that are of matching types may be selected to represent these dimensions. Further, the system may receive input to modify a portion of the data. For example, manipulation of a visual characteristic, such as through user input, may result in data mapped to the visual characteristic to be modified according the visual manipulation.

Visual characteristics of a graphical object for a visual display component may be determined in any suitable way. In some embodiments, parameters of data visualization for a graphical object may be inferred by an analysis of the visual characteristics of the graphical object. For example, a graphical object may have visual characteristics (e.g., shape) that provide for parameters (e.g., length of the boundary of the shape) which may or may not be applicable to certain types of data. In some embodiments, a developer or creator of a graphical object may explicitly define parameters of the graphical object according to certain visual characteristics of the graphical object through which certain types of data may be displayed. Similarly, as described above, data represented by a visual display component may be manipulated in any suitable manner.

In some embodiments, a system has access to a data set and a graphical object of a visual display component. The system analyzes the graphical object and the data set to determine whether visual characteristics of the graphical object are compatible for mapping of dimensions in the data set to the visual characteristics, resulting in a visualization of the data through the graphical object. The system also analyzes the graphical object and the data set to determine whether data visually represented by the graphical object can be modified based on the system receiving a user input. In cases where multiple graphical objects are available for visualization and/or manipulation of data, the system may propose to a user one or more of the graphical objects as visual display components which have characteristics that are suitable for representing each dimension of the data set that the user has indicated are to be displayed. The user may then select a suitable graphical object on to which the data set is to be mapped and the system may subsequently generate a visualization of the data. Further input may result in manipulation of visually represented data. In an example, once the data is bound to visual characteristics of a graphical object, the user may use a suitable input device (e.g., mouse pointer) to increase or decrease the size of a visual characteristic, resulting in the corresponding data to be modified accordingly.

Once a data visual is presented (e.g., on a display of a user interface) where dimensions of a data set are bound to visual characteristics of a corresponding graphical object, a user may interact with portions of the graphical object and/or the data set through a graphical interface and provide modifications to the data visual dynamically.

Embodiments described herein provide an ability for dimensions of data to be mapped to arbitrary graphical objects as visual display components for the dimensions of data to be suitably represented. Graphical objects may be created through any suitable graphical manipulation tool (e.g., MICROSOFT EXPRESSION® Studio, MAXON Cinema 4D). Graphical objects may include information (e.g., metadata) that sets forth the parameters through which dimensions of data may be bound to the graphical objects (i.e., to visual characteristics). In an embodiment, a software tool analyzes a graphical object and produces metadata that describes the extent to which data may be bound to various visual characteristics of the graphical object. In another embodiment, as part of the creation process of the graphical object, a user may expressly define parameters (e.g., described by metadata) of visual characteristics in the graphical object that may be mapped to certain types of data. In some embodiments, a software tool analyzes a data set, which may or may not have appropriate metadata to determine a number and type of dimensions that could be displayed, and determines one or more graphical objects that would be suitable to represent the data set. Such a tool may receive user input selecting dimensions of a data set to be displayed.

FIGS. 10-14, now described, illustrate a representative embodiment of visual display components provided on a user interface as graphical objects that can be manipulated to produce a visual representation of data in addition to data manipulation. It should be appreciated that the embodiment described does not serve as a limitation to aspects of the invention.

Figure 10:
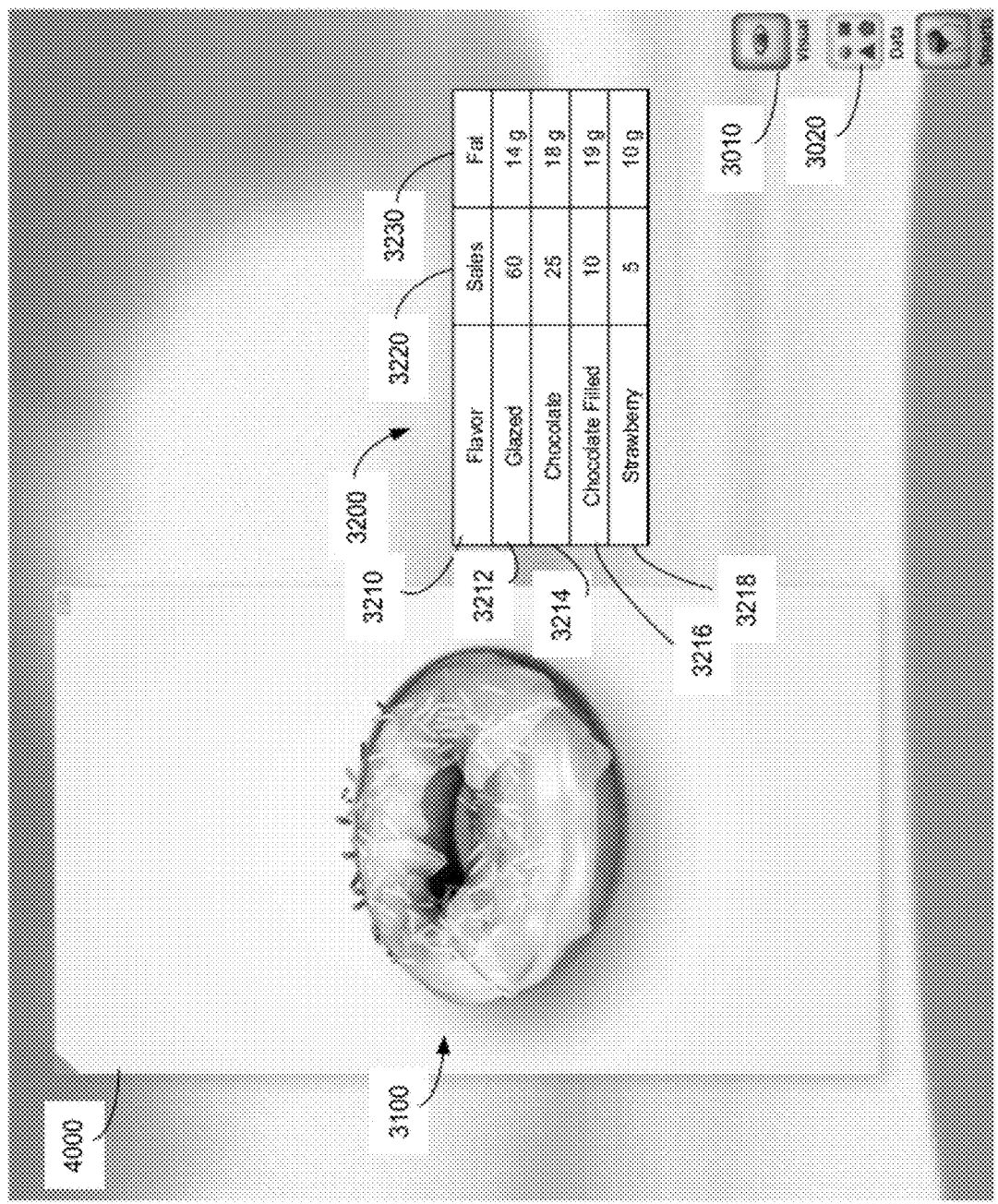
FIG. 10 is a representative illustration of a user interface having a visual display component through which a user is able to visualize data through a graphical object where dimensions of a data set are presented.

FIG. 10 depicts the selection of sales data for representation through a visual display component shown as a graphical donut 3100. A chart 3200 depicts dimensions of a data set, for example, sales data 3220 reported from a donut shop of different flavors of donut 3210, each flavor of donut having a fat content 3230. A listing of flavors of donuts 3210 and the respective sales 3220 and fat content 3230 for each flavor of donut is provided. As shown in the example, 60 million in revenue was reported from sales of the glazed donut having 14 g of fat, 25 million in revenue was reported from sales of the chocolate donut having 18 g of fat, 10 million in revenue was reported from sales of the chocolate filled donut having 19 g of fat, and 5 million in revenue was reported from sales of the strawberry donut having 10 g of fat. In the representative embodiment, the user selects the chart 3200 and applies the mapping of the data from the chart 3200 to the graphical donut 3100 as the visual display component. A method for making such a selection may involve, for example, the user manipulating a pointer 3000 to select the chart 3200 and dragging the data set over to the graphical donut 3100 for subsequent processing and visualization of data to occur by the system.

Figure 11:
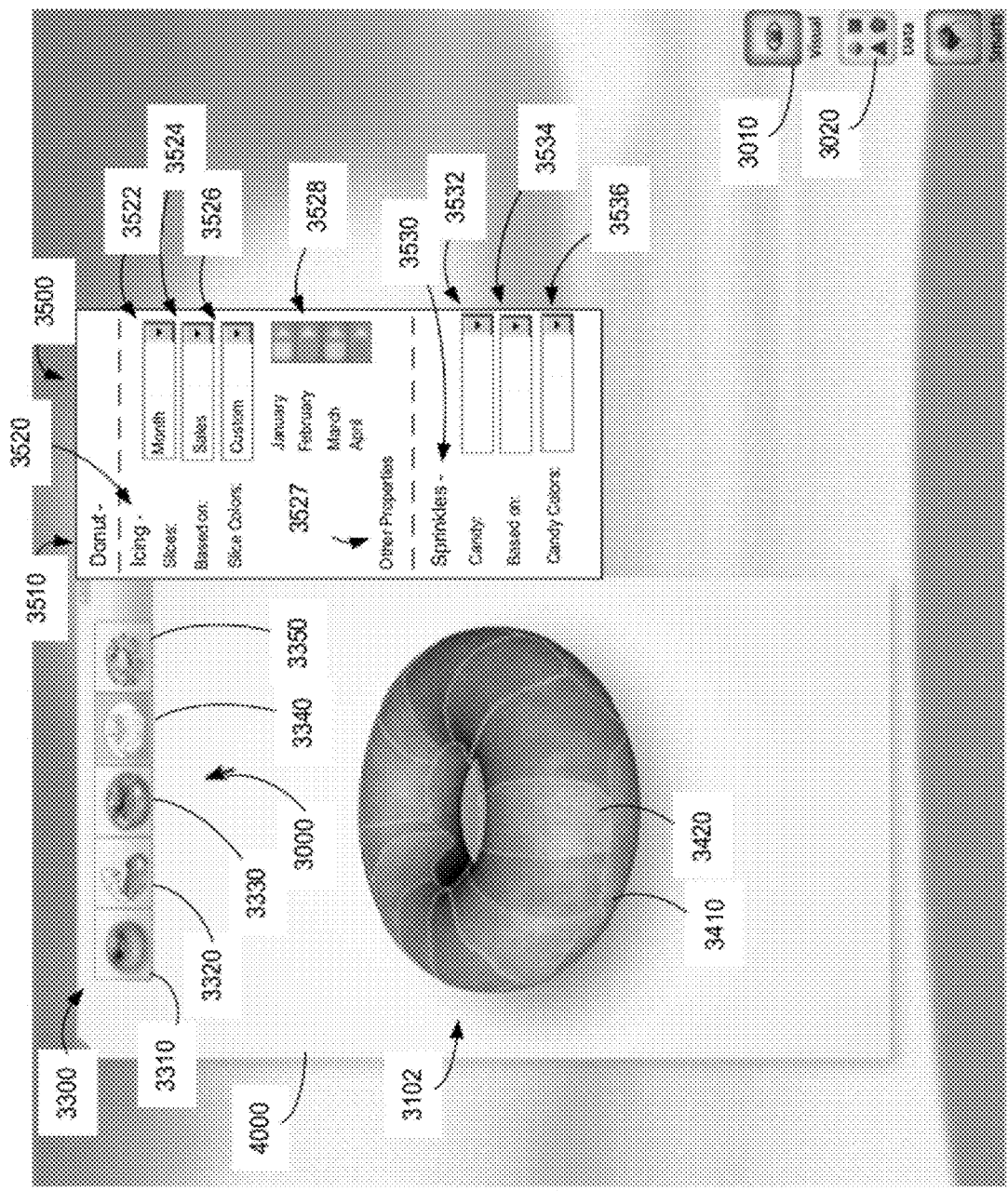
FIG. 11 is a representative illustration of the user interface of FIG. 10 in which visual characteristics of the graphical object are presented.

In the embodiment, the user interface is built based on metadata associated with the graphical donut 3100. As shown in FIG. 11, a number of parameters that describe a visual mapping between the data of sales reported and the graphical donut 3100 is displayed. Accordingly, based on the metadata incorporated in the graphical donut 3100, a modified graphical donut 3102 having sales data incorporated into the donut is presented. Graphical donut 3102 includes the dough 3410 and colors of icing 3420 segmented into twelve different regions. Each of the twelve regions corresponds to sales reported for each month of the year where the area occupied by each segment of icing 3420 is indicative of the amount of sales reported for that month. For example, when the area of a first segment of icing corresponding to a first month is depicted to be greater than the area of a second segment of icing corresponding to a second month, the sales reported at the end of the first month is interpreted in the sales representation to be greater than the sales reported at the end of the second month. Or, in another example, the color of icing displayed on a graphical donut may indicate a certain amount of sales. For instance, chocolate icing displayed for one segment may be indicative of greater sales reported for one particular month as compared with strawberry icing displayed for another segment, indicating sales reported for a different month. In some cases, data may be appropriately adjusted through manipulation of visual characteristics. For example, the system may receive one or more inputs to illustrate projected sales over certain months in comparison to actual sales over the same months. If a certain flavor of donut were available to sell in some of the months where it had not been available previously, the data represented by the graphical donut may be modified to incorporate more realistic figures for projected sales. Accordingly, an input may be provided to the user interface manipulating one or more visual characteristics, resulting in data corresponding to those visual characteristics to be appropriately modified.

In some embodiments, a number of proposed data visuals, through the same graphical object visual display component, are made available for the user to select. The proposed graphical donuts for representing the data are different in appearance as well as the number and type of visual characteristics to which data can be mapped. Accordingly, graphical donut 3102 is only one proposed data visual of how the data set may be displayed and/or modified. Indeed, a collection 3300 of proposed data visuals 3310, 3320, 3330, 3340, 3350 are presented on the canvas 4000 for a user to choose. In the example shown in FIG. 11, graphical donut 3102 corresponds to selection of proposed visual 3340. As shown, the graphical box representing proposed data visual 3340 is darkened and graphical donut 3102 is displayed on a main portion of canvas 4000.

In an embodiment, if proposed data visual 3310 is selected for the visual display component, the graphical donut displayed in the center of the canvas 4000 would only include parameters associated with the dough of the donut; that is, dimensions of data would be presented on the donut with respect to the dough of the donut, without reference to other visual characteristics such as icing or sprinkles. In such a case, it may be desirable, for example, that sales data for an entire year be displayed, without a break down of variation within the year (e.g., by quarter, by sales event). In an example, the dough of the donut may take up a larger volume for greater amounts of sales reported, and conversely, the dough may be smaller in volume for a smaller amount of sales revenues reported.

For example, if proposed data visual 3320 is selected for the visual display component, the graphical object displayed in the center of the canvas 4000 would include only portions of icing related to certain dimensions data that are to be presented, without showing the type of donut or sprinkles. For example, if it is desirable for sales data reported from only two quarters to be displayed, and not the entire year or sales from events during the year, then the icing graphic associated with only those two quarters will be presented.

Proposed data visual 3330 enables data to be presented by all three major visual characteristics of the graphical donut; that is, the dough of the donut, icing and sprinkles together. In such a case, and without limitation, the dough of the donut may represent a total volume of sales reported at the end of a year, the icing may signify the amount of sales reported at the end of each quarter, and the sprinkles may indicate the occurrence of particular sales events that have contributed to overall sales.

Proposed data visual 3340 refers to the graphical donut 3102 of FIG. 11, combining aspects of proposed data visuals 3310 and 3320, permitting data to be displayed by the dough of the donut and the icing, yet without sprinkles. Accordingly, for example, total sales reported at the end of a year is presented by selecting the donut and sales reported at different points throughout the year (e.g., monthly, quarterly) is displayed by selecting certain types of icing to represent the break down of those reported sales.

Selecting proposed data visual 3350 for the visual display component, for example, would result in the graphical donut displayed on canvas 4000 to include data displayed by the dough of the donut and the sprinkles, yet without icing. In an example, data represented by the graphical donut would include annual sales reported, represented by the dough of the donut, and discrete sales events, represented by the sprinkles.

Indeed, proposed data visuals for the visual display component may be selected as desired. For example, a proposed data visual may be chosen according to whether how appealing or interesting the style of the visual appears. A proposed data visual may also be selected based on its functionality, for example, the number of dimensions of data that can be displayed through the visual display component and/or the manner in which data represented by visual characteristics may be modified.

Also shown in FIG. 11, graphical manipulation tool 3500 illustrates an embodiment of another visual display component where various parameters of visual characteristics of the graphical donut 3102 may be adjusted. For example, "Donut" adjustment box 3510 may be manipulated by a user for the system to modify parameters of data visualization through the donut itself and/or the data that is represented by the donut. "Icing" adjustment box 3520 may permit a user to provide input for the system to modify parameters of how the icing of the graphical object is used to display data and/or the data itself represented by the icing. "Sprinkles" adjustment box 3530 may also provide a user with the ability to provide input for the system to adjust parameters relating to a mapping between the graphical sprinkles and the data presented by the sprinkles.

As discussed previously, a user chooses the type of graphical object corresponding to particular dimensions of data for the system to render the data visual. In the representative embodiment, the user has selected a graphical donut to represent data regarding the revenue generated from donut sales reported over a year. While aspects of adjustment in the "Donut" adjustment box 3510 are not shown, the box 3510 may be opened to reveal features relating to how visual characteristics of the graphical donut or the data itself represented by the graphical donut may be modified. For example, a different flavor donut may be selected to represent the data. Or, a dimension of the data may be adjusted through box 3510, resulting in an alteration of a feature of the data visual.

Given that graphical donut 3102 is displayed through selection of proposed visual 3340, features of the icing 3420 may be readily adjusted through modification of parameters in regions provided by "Icing" adjustment box 3520. "Icing" adjustment box 3520 includes a "Slices" region 3522 that provides a user with the ability to provide input for the system to adjust what dimensions of data are represented by the segments of icing depicted in the graphical donut and/or how data represented by segments of icing may be modified. A "Based on" region 3524 permits a user to provide input as to what type of data the icing generally represents and/or what type of data may be modified through representation by the icing. The "Slice Colors" region 3526 allows a user to determine what colors will represent certain slices of icing through the visual rendering. An "Other Properties" region 3527 is further provided where more options for adjusting parameters of the icing will appear upon selection of this region.

In the example shown, the "Slices" region 3522 is currently given a "Month" setting in the drop down box and the "Based on" region 3524 is set to a "Sales" setting. The "Month" and "Sales" settings result in the icing 3420 of the graphical donut 3102 representing sales data reported by the business at the end of each month. In some cases, the "Slices" region 3522 may be given a different setting, for example, an annual or quarterly setting. Similarly, the "Based on" region 3524 may also be set to a different parameter besides sales, for example, inventory or organizational structure. In an example, the "Based on" region 3524 may be set to reveal sales of a particular donut (e.g., glazed, chocolate, chocolate-filled or strawberry), rather than sales of all donuts, so that it can be determined which donuts are more or less popular.

The "Slice Colors" region 3526 follows according to settings determined by the "Slices" region 3522 and the "Based on" region 3524, denoting the colors of each slice to be "Custom" selected. Hence, color selection region 3528 is provided adjacent to the "Slice Colors" region 3526 for a user to select what colors in the graphical rendering will denote which segments in the graphical donut 3102 representing months of the year. In some cases, the "Slice Colors" region 3526 may be given a setting other than "Custom," for example, a "Default" setting where colors for each segment that represent months in the year may be automatically set to default colors determined by the system. Or, in another example, if the "Slices" region 3522 is set to an "Annual" setting (rather than by "Month"), then for sales data reported from the past few years, the color selection region 3528 may be reorganized so that selection of segments in the graphical donut 3102 represent past years as opposed to months.

Upon receiving user input for the above settings, the system retrieves the appropriate dimensions of data from the data set for mapping to the corresponding visual characteristic. Values of parameters that modify the appearance of each visual characteristic are set based on the values within each dimension. As a result, the graphical object is rendered according to the parameter values using known techniques for displaying objects with adjustable characteristics where data represented by the objects may also be manipulated through a user input. In the example, for the icing visual characteristic, as the "Slices" region 3522 is set to "Month" and the "Based on" region 3524 is set to a "Sales," the system acquires a dimension of data from the data set having to do with sales revenues reported for each month. Values of parameters corresponding to features of the visual characteristic that give rise to appearance are then set to match up with values of the dimension of sales revenues for each month.

Continuing to refer to FIG. 11, currently selected proposed visualization 3340 does not provide for data to be represented by sprinkles, so no options are available for parameters within the "Sprinkles" adjustment box 3530 to be adjusted. Even so, various regions are still provided for viewing in the "Sprinkles" adjustment box 3530, including a "Candy" region 3532, a "Based on" region 3534, and a "Candy Colors" region 3536, explained in further detail below with respect to FIG. 12.

Figure 12:
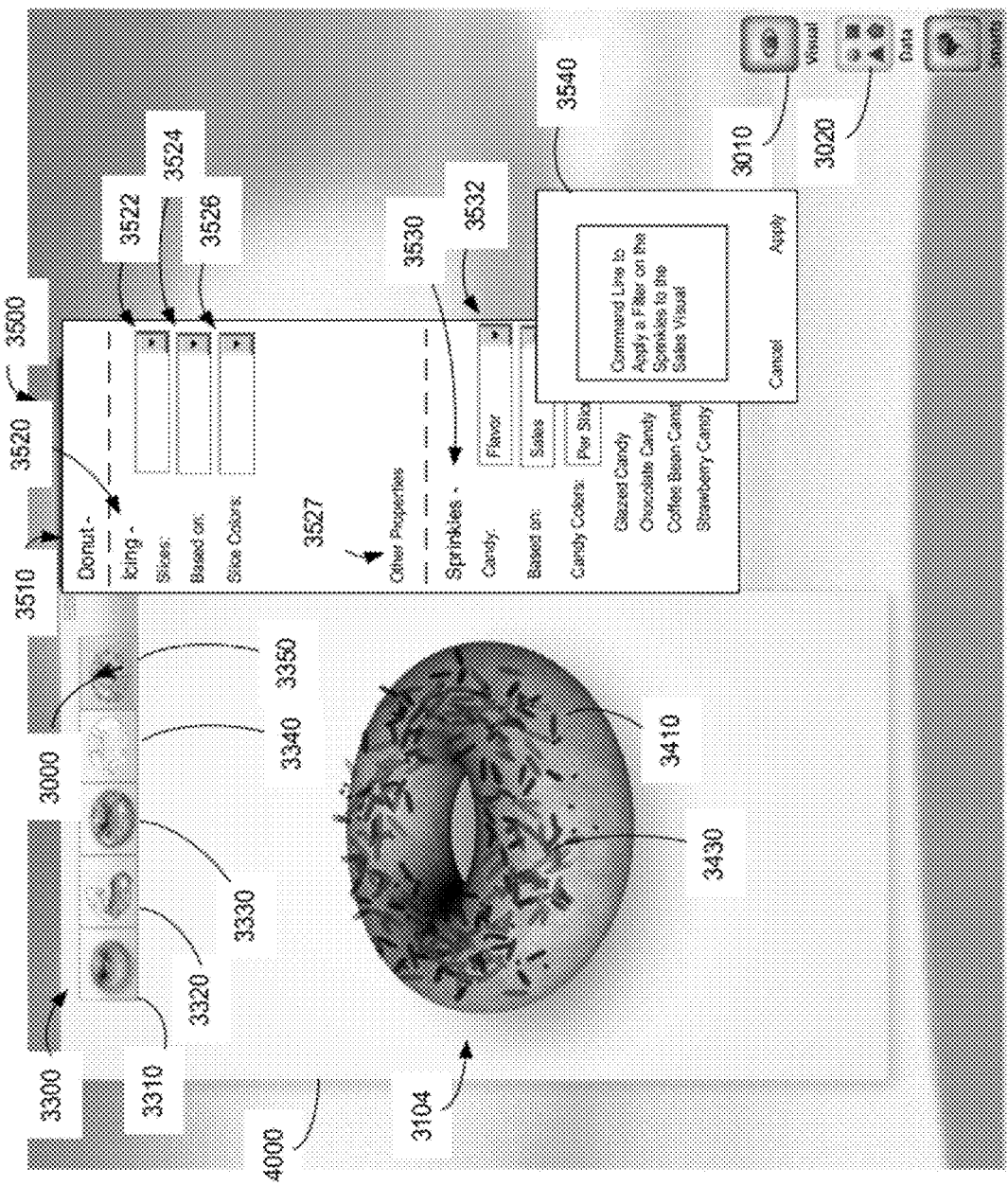
FIG. 12 is a representative illustration of the user interface of FIG. 11 where visual characteristics of the graphical object are further presented.

In FIG. 11, graphical donut 3102 is displayed on canvas 4000 via selection of proposed visual 3340, though, FIG. 12 depicts the result of selecting proposed visualization 3350. Hence, selection of proposed visualization 3350 results in a graphical donut 3104 without icing, yet having sprinkles, displayed on the canvas 4000. In an embodiment, proposed visual 3350 is selected by the user, resulting in the box representing proposed visual 3350 to be darkened and the transformation of graphical donut 3102 to currently displayed graphical donut 3104. As illustrated in FIG. 12, graphical donut 3104 includes the donut dough 3410 with sprinkles 3430 disposed atop the base, yet without the icing illustrated.

With the selection of proposed visual 3350, graphical manipulation tool 3500 depicts some variation from that illustrated in FIG. 11. The proposed visual 3350 does not provide for icing to be displayed in graphical object 3104, and so regions associated with "Icing" adjustment box 3520 are left blank. However, various regions are still provided for viewing in the "Icing" adjustment box 3520, including a "Slices" region 3522, a "Based on" region 3524 and a "Slice Colors" region 3526.

As further shown in FIG. 12, the "Candy" region 3532 of the "Sprinkles" adjustment box 3530 is currently set by the user to "Flavor," that is, for the flavor of sprinkles 3430 of the graphical donut 3104 to be adjustable by the system. The "Based on" region is set by the user to "Sales," indicating sprinkles 3430 rendered by the system to represent general sales reported by the company. The "Candy Colors" region is set through user input for the colors of candy to be depicted by the system "Per slice." A color selection region may be provided adjacent to the "Candy Colors" region to enable a user to choose what colors will correspond to which type of flavored sprinkles are rendered in the graphical donut 3104, such as for example, glazed candy, chocolate candy, coffee bean candy, or strawberry candy. In some embodiments, the appearance of a certain type of candy represents a sales event where a particular amount of revenue was collected. In an example not expressly illustrated or limited as such, glazed candy may represent sales events where more than 20 thousand in sales were accrued, chocolate candy may denote events where sales between 10 thousand and 20 thousand were collected, coffee bean candy may signify sales events of between 5 thousand and 10 thousand, and strawberry candy may represent sales events where less than 5 thousand in sales were collected.

Prior to or after a data visualization has been rendered by the system through a visual display component, various parameters of graphical objects and/or dimensions of a data set may be suitably adjusted, as desired. In some embodiments, subsequent to analysis of the data and a visual display component, the system may propose the visual display component through a user interface based on whether the visual display component is able to receive input for the data to be varied, as desired. Further, visual characteristics of a graphical object may be appropriately changed to suit a preferred manner of data visualization. For example, visual characteristics of the graphical object may be resized according to certain ranges provided by the data set to be presented. Or, resizing of visual characteristics may give rise to alterations in corresponding items of data.

Certain characteristics of the graphical object may be assigned to different colors, or transformed altogether, according to desired parameters for the data visualization. In some instances, visual characteristics may be subject to constraints where certain features of the appearance of a visual characteristic is limited by the constraints set on parameters of the visual characteristic. For example, to reduce computational expense, a constraint on a visual characteristic to limit the representation of data values within a tolerance of 1% precision can be set. In some embodiments, rendering of data through a visual display component involves replicating or subdividing at least a portion of a visual characteristic multiple times. For example, in binding data to a visual characteristic, visual elements of the visual characteristic, such as bars, points or pie segments, may be suitably replicated or subdivided. The ability for the system to replicate or subdivide particular visual elements of a visual characteristic may further be subject to constraints. For example, one constraint may be for a bar of a visual characteristic to be restricted to no more than 10 subdivisions. Or, another constraint may be for angles of a pie segment to be restricted to no less than 5 degrees.

In some cases, manipulating the data may result in alterations of visual characteristics in the graphical object. For example, when dimensions of data are added, removed and/or subject to filtering, the visualization of data through the graphical object may be appropriately modified according to how the data is adjusted. Conversely, alterations of visual characteristics in the graphical object (e.g., adjusting of a feature of a visual characteristic) may result in the data itself to be modified.

In the example provided of the graphical donut, the toroidal shape of the donut provides for sales data to be displayed according to sales reported during certain periods of a fiscal year. Thus, while not being limited as such, the donut is partitioned into segments in accordance with sales reported at various points in the year. Alternatively, the ability for sprinkles to be scattered about any location on the surface of the donut can map to data that records the occurrence of certain sales occasions during the year. It should be understood that the above description provides only an exemplary embodiment of a data visual. Indeed, visual characteristics of a graphical object may have parameters to suit any desirable mapping of dimensions in a data set to the visual characteristics and/or modification of data represented by the graphical object.

While parameters of visual characteristics in a graphical object may be appropriately varied, dimensions of data and/or visual characteristics themselves may be subject to certain filters and/or constraints. When a filter or constraint is applied to the data visualization, a modified data visual is generated in accordance with the filter or constraint. For example, a parameter that specifies a broad range under which dimensions of data fall may provide for a visualization of a large number of dimensions of a data set. However, applying a filter that changes the parameter to a narrower range under which dimensions of data fall will result in a modified visualization of a smaller number of dimensions of data to be represented. Similarly, values of parameters that define the appearance of certain visual characteristics may be set according to one or more constraints. As a result, only certain values within a dimension of data may be displayed through the visual characteristics through which the constraint(s) are applied.

Figure 13:
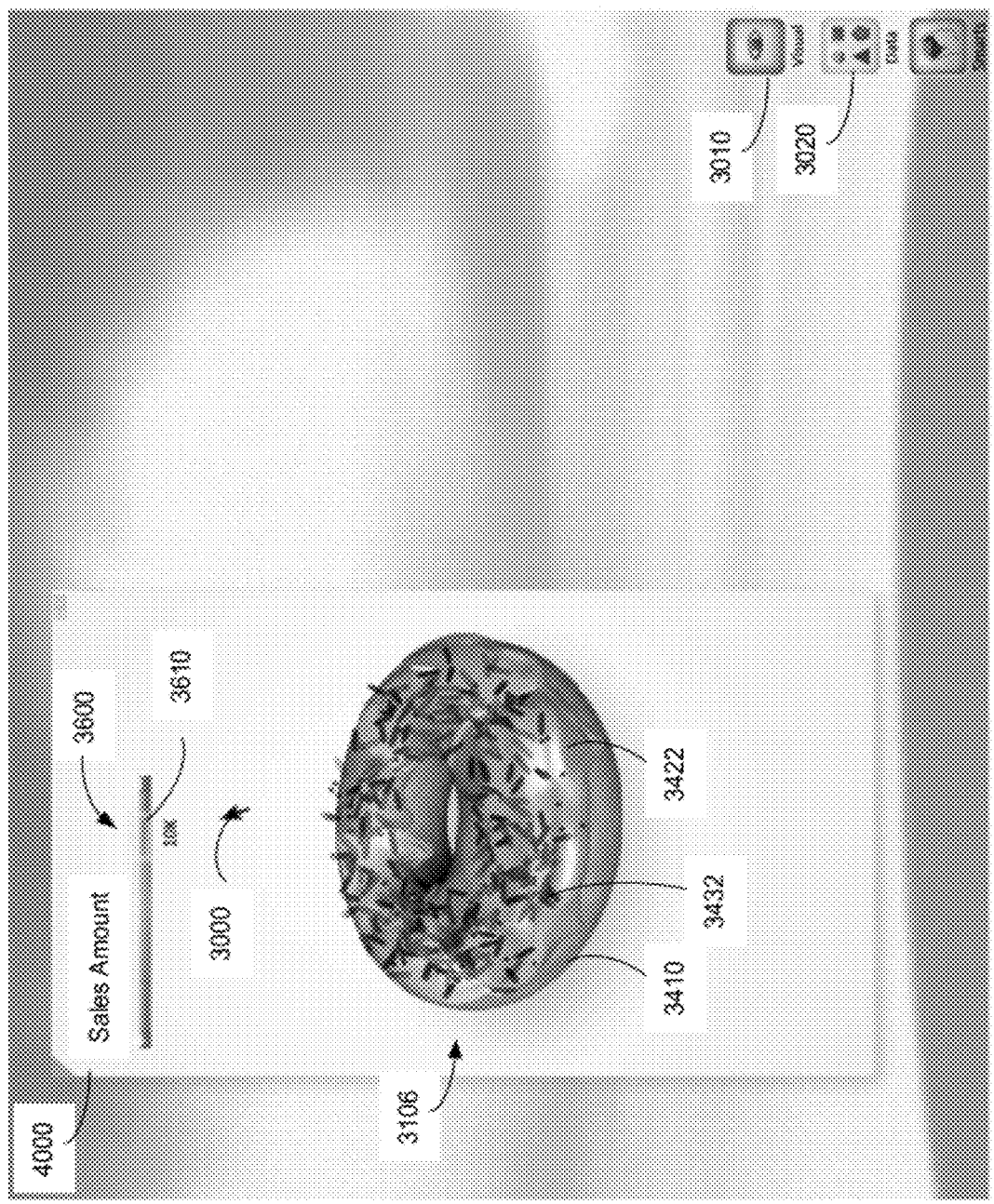
FIG. 13 is a representative illustration of a user interface having a visual display component where a filter applied to a dimension of the data set influences the appearance of a visual characteristic of a graphical object.

FIG. 12 depicts a filter command box 3540 that provides the ability for filter criteria to be applied to the data visualization. The filter command box 3540 applies a filter to the sprinkles 3430 of the sales data visualization. Once applied, FIG. 13 illustrates a graphical donut 3106 having a donut base 3410, icing 3422 and sprinkles 3432 where one or more visual characteristics are linked to the applied filter. In particular, the sprinkles 3432 are mapped to a set of data that is filtered according to setting a sliding scale 3600 that refers to sales recorded within a certain amount range. A highlighted range 3610 shown along sliding scale 3600 is provided as a filter for the data represented by the graphical donut. In this example, the number of sales events where the amount collected falls within the highlighted range 3610 is represented by the number of sprinkles on the graphical donut. As shown in FIG. 13, for graphical donut 3106, sales events where the amount collected was within a range of about $10,000+/-$1,000 are represented as sprinkles 3432.

Figure 14:
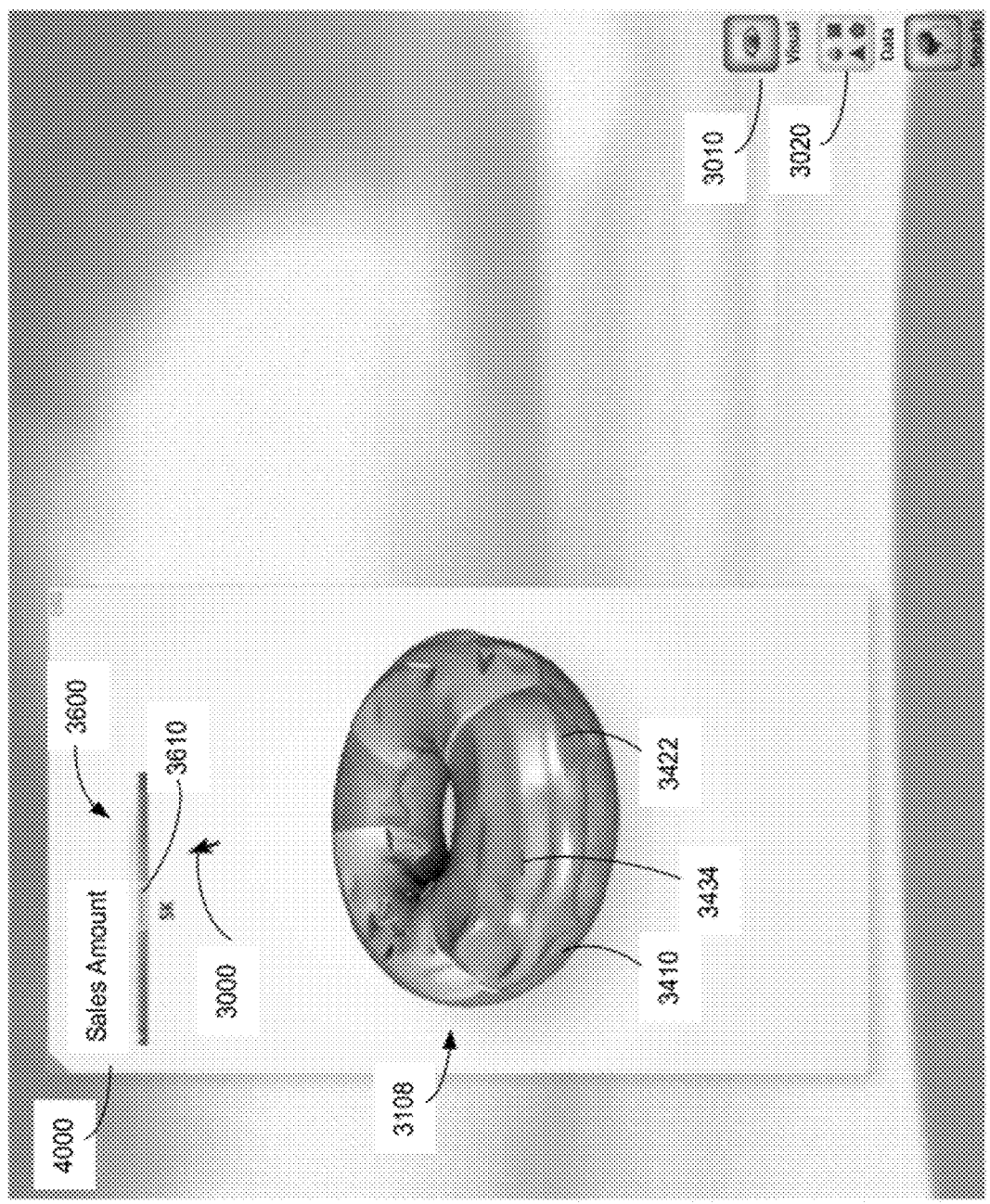
FIG. 14 is a representative illustration of the user interface of FIG. 13 in which the visual characteristic of the graphical object is further subject to the filter.

However, turning toward FIG. 14, the highlighted range 3610 that centered around $10,000 is moved to a range of about $5,000+/-$1,000. Accordingly, the graphical donut 3106 of FIG. 13 is transformed to the graphical donut 3108 of FIG. 14 where only sales events that qualify within the range of $5,000+/-$1,000 are displayed, as sprinkles 3434. As depicted, the amount of sprinkles 3434 shown is substantially less than the amount of sprinkles 3432, denoting that there were substantially more sales events with amounts collected in the $10,000+/-$1,000 range as compared with sales events with amounts collected in the $5,000+/-$1,000 range. It should be appreciated that depiction of applied filters shown in FIGS. 13 and 14 are provided by way of example and that any suitable set of filters or constraints can be applied to a visual display component that represents data. Features of the visual display component may be dynamically adjusted through any appropriate user interface.

Metadata may be associated to visual characteristics of visual display components to define parameters through which data may be bound to the visual characteristics and/or how data may be manipulated through input received via a user interface. Such metadata provide information for how binding or mapping of dimensions of data to visual characteristics may occur. For example, the parameters that define how visual characteristics may receive data to be represented through the visual characteristics may include metadata that inform how the visual characteristics may be adjusted or changed (e.g., transformed, scaled, re-shaped, colored, etc.).

In the example above, to display how much revenue was collected during a certain quarter, the color of icing would identify the particular quarter of interest and the volume of icing would represent the amount of revenue collected for that quarter. In an inverse example, for visualizing the same information, a different set of parameters could be defined, such as the color of the icing to represent the amount of revenue collected for that quarter and the volume and location of icing specifying the particular quarter of interest. It can be appreciated that visual characteristics of visual display components may be adjusted in accordance with any suitable parameters so as to accurately and effectively represent the data.

The parameters that define how data may be bound to visual characteristics may include metadata that provides constraints as to what degree the visual characteristic(s) may be manipulated. That is, there may be aesthetic or proportional aspects of visual characteristics of the visual display component that limit certain dimensions of data from being displayed. Indeed, for some embodiments, certain data structures may be outside the scope of what a visual display component may be able to represent.

Further, metadata may be associated with the data set itself to define parameters that describe how dimensions of data may map to certain visual display components and how certain dimensions of data may be modified by the system receiving input through the visual display components. For example, different data sets may have intrinsic differences. In an embodiment, a data set may be represented as a continuous variation, such as through a gradient depicted through a visual characteristic. Alternatively, a data set may be displayed as a set of enumerable discrete values through, for example, discrete features of a visual characteristic. Metadata may indicate whether the data set includes a particular range of data values, or for example, geometric implications such as locations, structural features and/or coordinates. Metadata may describe dimensions of data having relationships within sets, for example, a listing of peer values or alternatives. In some cases, certain dimensions of data in a data set may be discarded as outliers, and not included in the visualization of the data set. Dimensions of data may also be described by metadata as to whether the data is sampleable, quantizable and/or smoothable in nature.

A system that produces a visualization of dimensions of data by mapping the dimensions of data to an independently created graphical object may implement the visual display component through any series of steps. In an embodiment for implementing the visual display component, a system analyzes the metadata and/or parameters associated with visual characteristics of the graphical object. The system also analyzes metadata and/or parameters intrinsic to the data set itself. The system then identifies certain visual characteristics of the graphical object and the ability for certain types and dimensions of data map to one or more visual characteristics. Schemes for transforming dimensions of the data set to suit the process of mapping the visual characteristics to the dimensions of data are also ascertained.

Further, a number of proposed visualizations for binding dimensions of data in the data set to visual characteristics of the graphical object may be presented. Accordingly, a user may select which of the proposed visualizations of the data is preferred to suit the user's interests (e.g., understanding the data better, presenting to the data to a group, etc.).

Additionally, and as described above, parameters of the visual characteristics as well as the dimensions of data may be appropriately manipulated, as desired, to yield modified visual display components for representing data.

In some embodiments, an analysis is performed (e.g., on the metadata of one or more visual display components) in determining whether a visual display component can suitably represent and/or operate on a data set so as to interact with dimensions of variability in the data. In some cases, the visual display component is evaluated as to whether aspects of the visual display component can be modified, such as adjustment of certain visual features subject to certain rules or constraints. For example, the system may analyze the metadata of the visual display component and identify visual elements of the visual display component that can be modified or visual elements that are not currently included in the visual display component that can be added for further interaction with the data. The effects of how these elements may be incorporated with the visual display component may be presented on a user interface and an option to incorporate this change may be suitably provided on the user interface. Or, instead of modifying an existing visual display component, a different visual display component altogether may be suggested on a user interface for potential selection of the visual display component.

In another type of visual display component, filter criteria may be provided to a data set one dimension at a time where ranges of values can be adjusted to specify the filter criteria (e.g., with a slider) in a certain dimension to see the number of items resulting after the filter criteria are applied. If the number of returned values is too high or too low, the filter criteria can be changed for that dimension or the range of values for another dimension can be adjusted to yield a different number of items. The visual display component may be analyzed by the system and suggested on a user interface in accordance with whether the visual display component is capable of receiving user input specifying a change in the data represented through the visual display component.

For example, for data related to houses, various dimensions may be correlated in ways that are not apparent to a user. Price, number of bedrooms and location may be correlated such that, as the user changes values of filter criteria in each of these dimensions, the number of houses meeting the criteria may vary in a way that cannot be easily appreciated by a user. As a specific example, a user may view a listing of about 25 houses meeting the user's criteria. The user may specify filter criteria that to limit results to houses offered for sale for $250,000 to $300,000, with three bedrooms and within 10 miles of the center of a city. These criteria may be overly restrictive and return no houses matching the criteria. In response, the user may relax the filter criteria to include houses offered for less than $500,000, with 2 or more bedrooms and within 20 miles of the city center. These criteria may return substantially more than 25 houses because there are several neighborhoods about 12 to 15 miles from the city center that have houses offered for sale for $250,000 to $300,000, with three bedrooms.

In that case, the user's initial intent could have more nearly been met by expanding the filter criteria for distance from the city center to 12 miles. However, it may take the user multiple attempts at setting the filter criteria to eventually recognize this fact.

In some embodiments, continuing the example of a user searching for information on houses for sale, a visual display component may quickly display the effect on the distribution of offering prices when filter criteria associated with distance is relaxed would allow a user to test the effect of each of multiple possible values of the distance criteria in excess of 10. As a result, the user may be able to quickly identify 12 miles as an appropriate filter criteria to yield a desired number of filtered results. Similarly, by providing a system that computes for a user a value along the distance dimension that, if applied as a filter criteria, yields a filtered data set with a specified number of houses in the $250,000 to $300,000 price range, the user can quickly select appropriate filter criteria.

For example, the device may receive user input through a visual display component specifying a change in filter criteria associated with a value in one dimension, regarded as a master dimension, and compute a distribution of the number of items in one or more other dimensions, regarded as subordinate dimensions. Alternatively or additionally, the device may receive user input specifying a value at a location in the distribution in a dimension, a subordinate dimension, and may compute a criteria in another dimension, regarded as the master dimension, that yields the specified value.

In some cases, a summary of a data set is calculated such that a processor can use the summary to effectively model a number of results through a visual display component that would be returned if the data set were filtered based on filter criteria. A user can input ranges for any of multiple dimension(s) and, for example, based on the summary, the user is able to quickly receive an indication of the distribution of how many items within the data set fall within the user-specified range(s) for each dimension. The user can repeatedly adjust the range(s) for particular dimensions and automatically receive updated indications as to the corresponding number of items within the data set that fit within the specified criteria. Alternatively or additionally, the user can adjust the number of items for a particular value in a dimension and an indication can be automatically generated based on the summary of how the range of values for the original dimension should be varied to achieve the specified number of items.

In some embodiments, dimensions of the data set are displayed and accessed by a user on a visual display component through a graphical user interface. Each dimension can be represented by a slider on an interactive display where a range on the slider for the dimension can be easily adjusted through an appropriate user interface. The sliders may also include indications of the distribution of items within the filtered data set for at least a portion of the dimensions.

In some embodiments, a dimension may be designated on a visual display component, such as by user input, as a master dimension and other dimensions may be designated as subordinate dimensions. The system may show distributions for the subordinate dimensions of items in the data set that have been filtered based on a range of values specified for the master dimension. For example, a visual display component may include multiple dimensions presented as repeating objects such as through a histogram where interactions between these dimensions may occur. The distributions for one or more of the subordinate dimensions may be automatically adjusted dynamically on the interactive display as a user provides inputs relating to a range in the master dimension. A user can repeatedly adjust the range of the master dimension as many times as desired and view changes in how the items that fall within the adjusted range(s) are distributed in the subordinate dimensions. Such a display may help a user visualize ranges of values of each of the dimensions that may serve as filter criteria that generate a filtered data set of a desired size and focus. Such characteristics are considered by an analytic engine when deciding whether an aspect of a visual display component is suitable for representing and/or manipulating a data set. Thus, visual display components may be proposed based on a prediction of whether a user may find it beneficial to see how particular dimensions will vary depending on relationships between the dimensions.

Alternatively or additionally, the user can provide input through a visual display component indicating a desired distribution of items in a subordinate dimension and a range can be specified as filter criteria in the master dimension that will yield the indicated distribution in the subordinate dimension. In some embodiments, the distributions are represented as histograms and user input relating to a desired distribution is provided by user input indicating a desired value for a bar in a histogram representing the distribution for the subordinate dimension. Regardless of how the desired distribution is specified, the system may use this input to compute a range for the master dimension that, if applied as a filter criteria to the data set will yield the desired distribution in the subordinate dimension. The system may then dynamically change the display on the visual display component to indicate the range in the master dimension. The impact of the distributions in the subordinate dimensions may also be displayed. In this way, the user can explore the relationships between the dimensions to arrive at desired filter criteria, possibly including ranges of values in multiple dimensions.

The system may provide a visual display component on a user interface to support such exploration in any suitable fashion. Dynamic exploration of filter criteria can be performed by a user through the use of interactive sliders and bar graphs on the visual display component. The user can, using conventional techniques for graphical user interfaces, provide input that adjusts the range of a slider, corresponding to a dimension, on an interactive display. The system may dynamically compute and then display the distributions of items along one or more dimensions based on the user input. Likewise, conventional interface techniques may be used to specify a value for a bar in a bar graph and display computed results based on that input. Though, it should be appreciated that any suitable interface techniques may be used through a visual display component to receive user input and present to the user results of applying that input.

Figure 15:
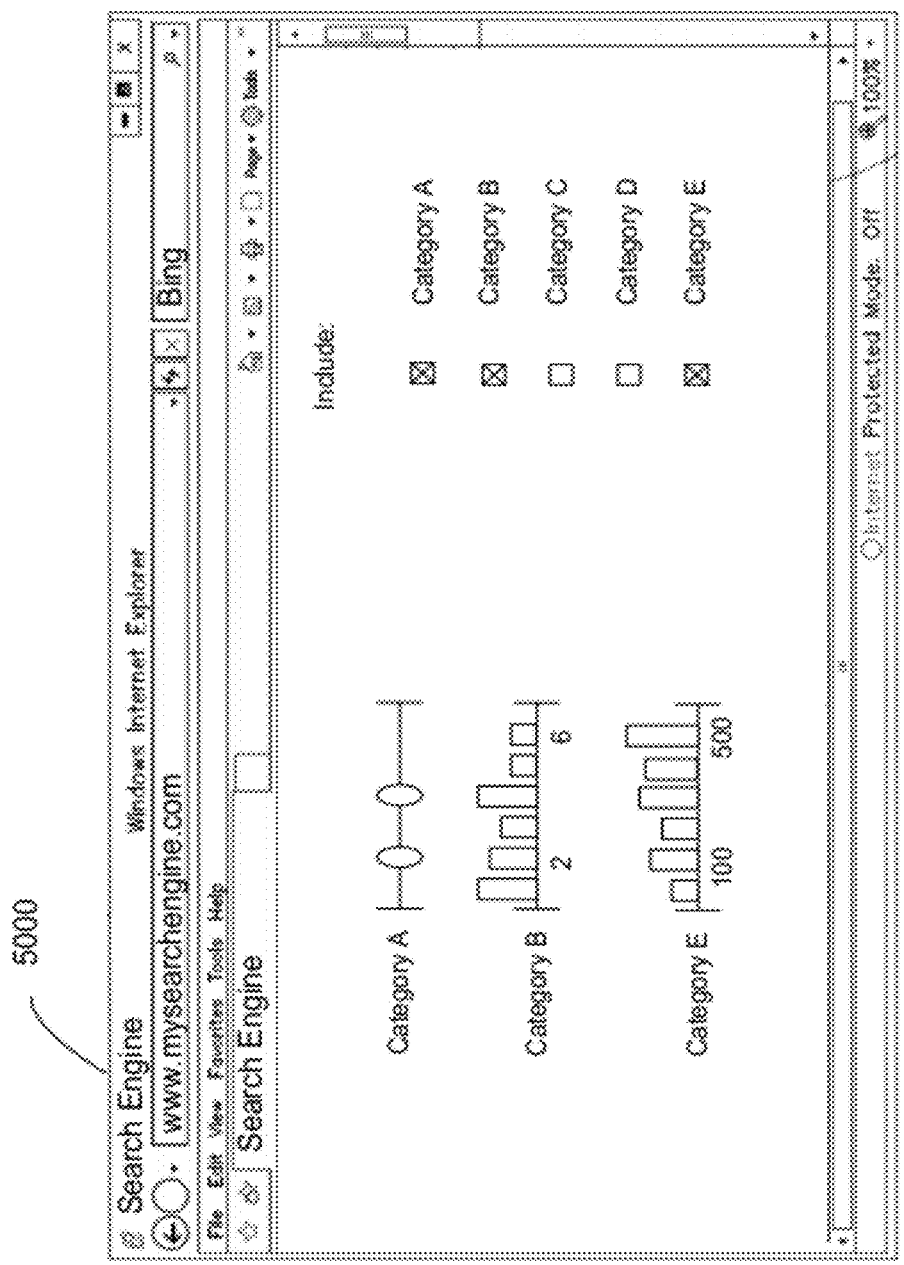
FIG. 15 is an example of a user interface having a visual display component through which a user may interactively explore filter criteria.

FIG. 15 is an example of a user interface via which a user may interactively explore filter criteria from a data set and manipulate portions of the data set using a visual display component. In this example, a user may have access to a database of information related to a particular area of interest. The user may choose which categories of data are important and visually explore filter parameters for the data. An analytic engine may make a determination as to which visual display component(s) available to the system may be desirable for the FIG. 15 illustrates the interface being displayed by a web browser 5000, although any suitable application to generate a user interface may be used. The web browser 5000 may be any suitable web browser, illustrated in this example as being INTERNET EXPLORER® developed by Microsoft Corporation, and may execute on a computing device operated by the user (e.g., computing device 105 of FIG. 1). The visual display component includes visual elements that depict dimensions of data identified as "Category A", "Category B" and "Category C."

It should be understood that a visual display component on a user interface may include any suitable interactive mechanism. As such, visual display components are not required to include sliders and/or bar graphs, or even be graphical in nature. Rather, a suitable visual display component on a user interface may include text command prompts for a user to input adjusted ranges and/or numbers of items that correspond to a specified value of a category. When the user enters an adjusted range for a master dimension, for example, the number of items for other dimensions may be automatically output for the user to observe. Similarly, when the user modifies the number of items for a particular value in a dimension other than the master dimension, the corresponding range adjustment of the master dimension can be automatically output to the user. Accordingly, for some embodiments, the visual display component may be analyzed by the system to determine whether it may receive input through a user interface for suitable manipulation of the data. If so, the visual display component is presented as a suggestion for a user to potentially select through the user interface for implementation.

In some embodiments, an analysis is performed of one or more visual display components (e.g., on the metadata) to assess whether the visual display component can suitably operate on a data set so as to interact with dimensions of variability in the data. In some cases, an evaluation is made as to whether aspects of the visual display component can be modified, such as adjustment of certain visual features subject to particular rules or constraints. As such, the system may analyze the metadata of the visual display component and identify visual elements of the visual display component that can be modified or visual elements that can be added to the visual display component for interaction with the data. For example, the system may determine that an additional slider component or check box may be worthwhile to incorporate within a visual display component, for better representing and/or manipulating the data. The effects of incorporating these elements with the visual display component may be presented on a user interface and an option may be given as to whether the visual display component will be updated. Alternatively, rather than modifying an existing visual display component, a different visual display component may be suggested altogether on a user interface for potential selection of the visual display component.

FIGS. 16-22 provide an illustrative example of a visual display component 6000 presented on a graphical user interface where a user is able to dynamically explore various filter criteria for a data set using methods provided herein. In particular, the example of FIGS. 16-22 illustrates an interactive sequence for exploring filter criteria for real estate properties. In various embodiments, a system may analyze the visual display component and the data set to be potentially displayed through the visual display component and determine the suitability for the visual display component to receive user input representing a change in the data set for interaction with the data set.

In the scenario illustrated, the selected visual display component is provided access to a set of real estate information. In this example, visual display component 6000 includes regions 6070 and 6080 that permit a user to identify portions of the data set that are of interest. In this regard, a user may choose which items in a database of real estate information will be included the data set. For example, region 6070 contains controls that provide the ability for a user to include certain types of real estate property. As shown in FIGS. 16-22, the user has activated certain of these controls to generate instructions to the server to include houses, townhouses, condos and multi-family homes, yet has excluded plots of land. Similarly, region 6080 contains controls that provide the ability for a user to specify other types of real estate property. In this example, the user has included realtor listings and listed foreclosures.

In this example, dimension 6010, corresponding to price, has been designated as a master dimension. Such a designation may be pre-programmed into the visual display component, or a user interface may accept input to designate particular dimensions as the master dimension. In the operating state shown in FIG. 16, the visual display component 6000 incorporates the data set and includes slider components 6012, 6022, 6032, 6042, 6052 and 6062 within the visual display component.

In a situation where price is designated as the master dimension, the visual display component provides for a distribution of items to be displayed in each of the subordinate dimensions as a function of price ranges specified through filter criteria. Accordingly, once a range is specified for a price, the visual display component displays a distribution in each of the subordinate dimensions. Accordingly, each of the slider components associated with a subordinate dimension may include superimposed on it a histogram representing the distribution in the associated dimension.

A user may provide input to a visual display component 6000 through a graphical user interface in any suitable way. In this example, a user utilizes pointer 6002 to interact with the visual display component 6000 using techniques as are known in the art. For example, pointer 6002 is able to activate controls that include certain dimensions in the display, designate a dimension as a master, adjust ranges, and/or indicate a value of a bar on a bar graph.

In this example, slider components are shown for each of multiple selected dimensions. Dimension 6010 indicates selling price of real estate property. Slider component 6012 includes controls that indicate a range for the sale price. In this case, the controls allow a user to separately specify a lower and upper end of the range. A user may activate these controls to specify the range. These ranges may be used to specify filter criteria that may be applied to a database to select from a data set particular items meeting a user's criteria. For example, when a user activates the GET DATA control 6092, a computing device may transmit to a database or server a request for a data set filtered by criteria specified by the positions of the controls on each of the slider components. In response, an appropriate set of data may be accessed by the computing device for display to the user. It should be appreciated that any suitable mechanism may be used to trigger transfer of a filtered data set to the client computing device.

In FIGS. 16-22, dimensions indicated as the subordinate dimensions include bar graphs that illustrate the distribution of items in the data set as filtered by the range prescribed by the master dimension. In the scenario illustrated, the price range shown for dimension 6010 is between $425 k and $450 k and the distribution of items in the data set having a price between $425 k and $450 k is illustrated for each dimension by the bar graphs.

In this scenario, dimension 6020 represents a number of bedrooms in a real estate property. A slider component 6022 includes controls that allow a user to indicate a range of a number of bedrooms for a particular real estate property, which may be used as a filter criterion. A bar graph associated with the slider component 6022 illustrates the approximate number of items in the data set that have various numbers of bedrooms and that have a price within the price range specified by controls on slider component 6012. As shown, in dimension 6020, there are more properties that have two bedrooms falling within the $425 k-$450 k price range than properties that have one bedroom.

The bar graph associated with slider component 6022 may be suitably generated. The bar graph associated with slider component 6022 may be generated based on histograms associated with subordinate dimension 6020, here representing a number of bedrooms. In this example, the relevant histogram is to be generated for the data set filtered by the criteria defined for the price range on slider component 6012, acting as the master dimension.

In some cases, values for the bar graph in connection with slider component 6022 may be generated using an interpolation operation. As described above, each range of values associated with the master dimension may be defined by a pair of values, one representing the lower end of the range and one representing the higher end of the range. In this case, that pair of values is ($425K, $450K).

Dimension 6030 represents the category having to do with the number of bathrooms included in a real estate property. A slider component 6032 illustrates the number of bathrooms for real estate properties while bar graphs associated with the slider component 6032 depict the approximate number of items provided in the data set that have a certain amount of bathrooms and that cost within the price range provided by the master dimension. As depicted, in dimension 6030, there are more properties having three bathrooms that fall within the $425 k-$450 k price range than properties having one bathroom.

Similarly, for square footage of real estate, dimension 6040 indicates the category that pertains to the number of square feet that the property includes. A slider component 6042 depicts the square footage of various properties. Bar graphs corresponding to the slider component 6042 show the approximate number of items in the data set that have a certain square footage and that cost within the price range depicted. In dimension 6040, there are more properties that fall within the $425 k-$450 k price range that have less than 800 square feet than there are having more than 800 square feet and falling within the above price range.

Dimension 6050 represents the year the property was built. A slider component 6052 depicts the years that various properties were built. Bar graphs relating to the slider component 6052 depict an approximate number of items in the data set that were built in a particular year and that are selling within the price range indicated by the master dimension.

For square footage of real estate properties that are disposed near a waterfront, dimension 6060 provides a category having to do with the number of square feet that the property includes adjacent to a waterfront. A slider component 6062 shows the square footage of various properties near a waterfront. Bar graphs corresponding to the slider component 6062 depict the approximate number of items in the data set that have a certain square footage near a waterfront and that cost within the $425 k-$450 k price range provided by the master dimension.

Figure 17:
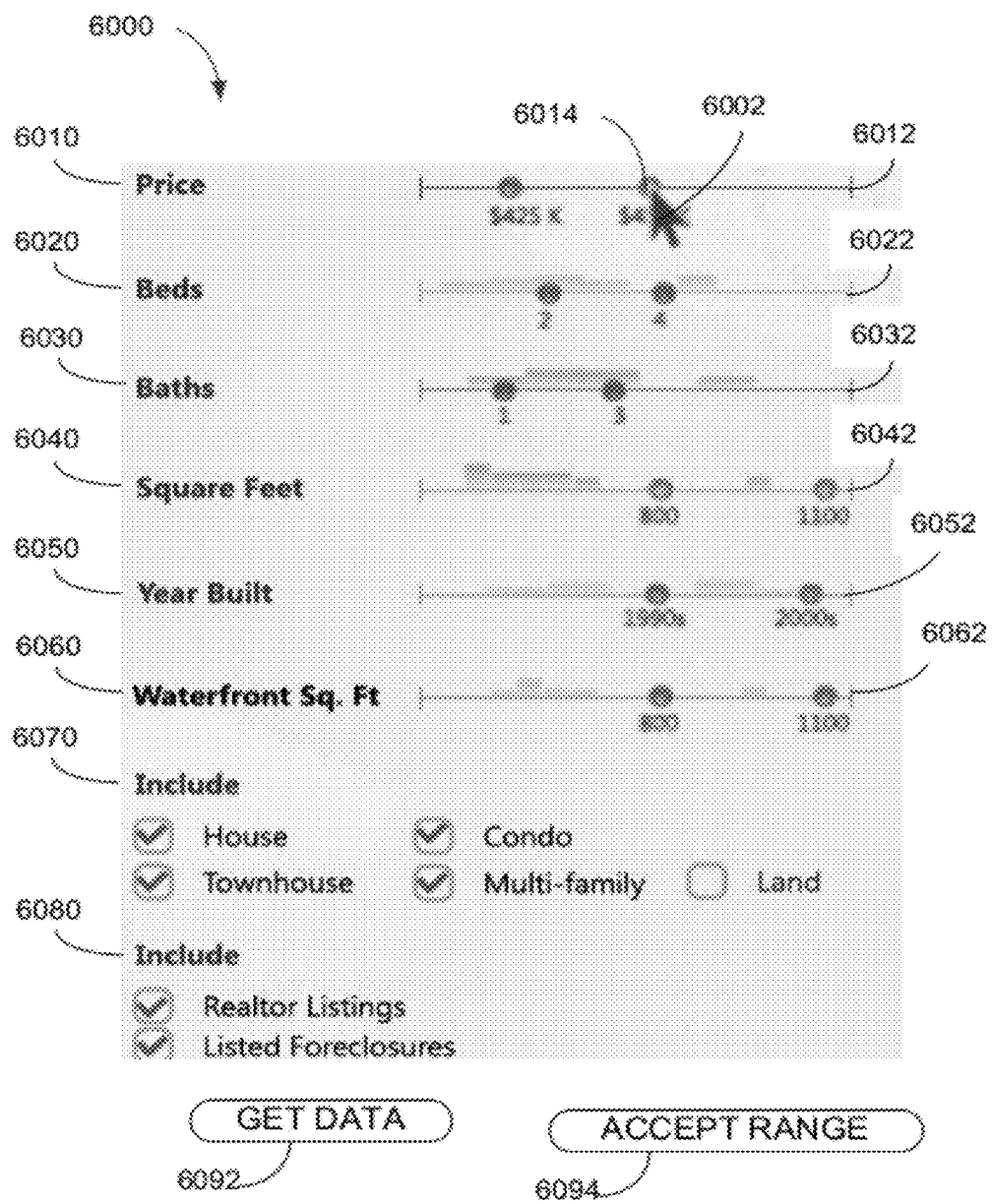
FIG. 17 is an illustration of the visual display component of FIG. 16 in a state in which a filter criteria corresponding to a range of a master dimension is being adjusted.
Figure 18:
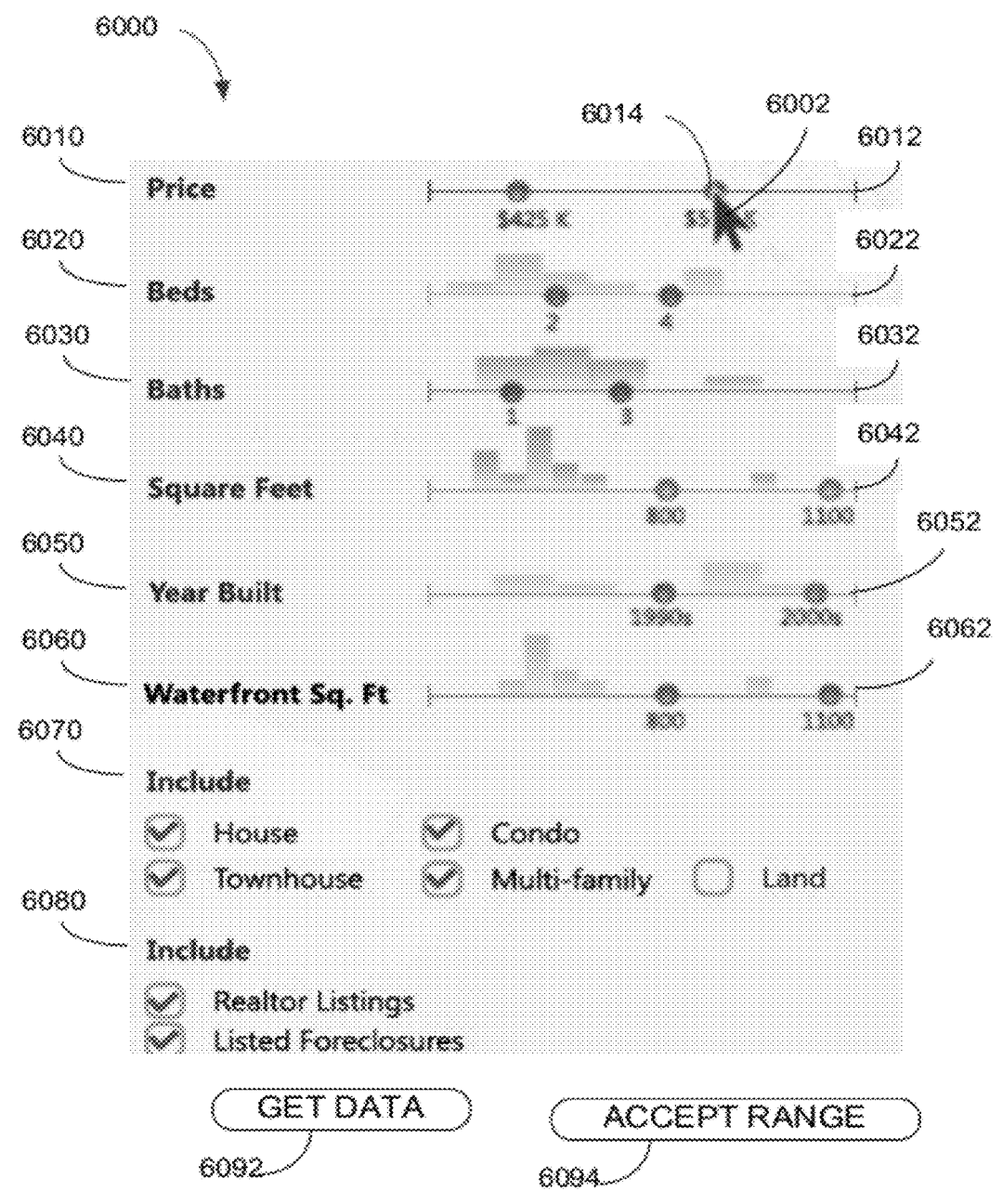

If the user provides input to change the range of the master dimension, the computing device can update the bar graphs associated with each of the subordinate dimension. As illustrated in FIG. 17, pointer 6002 is maneuvered over to slider component 6012 of dimension 6010 in the visual display component. In particular, pointer 6002 is positioned over the upper limit of the price range, at $450 k. Upon selecting the control 6014 that depicts the upper limit at $450 k, the user will be able to adjust the range of prices provided by the master dimension. It can be appreciated, as shown in FIG. 18, that as the user increases the price range for dimension 6010, which is currently selected to be the master dimension in the visual display component, the number of items that fall within that price range, depicted by distributions of respective bar graphs in the other dimensions, increase. Generally, broadening the price range for property will provide more options within the data set as to what can be purchased under various specifications. Similarly, narrowing a price range would decrease the number of options available in the data set under certain specifications. In some cases, providing user input to adjust a range of the master dimension to visually represent a portion of various other dimensions in a data set results in a modification of the dimensions of data and/or metadata within the data set.

In FIG. 18, the user has manipulated pointer 6002 to increase the price range determined by slider component 6012 by moving the upper limit control 6014 to $550 k. The price range has now changed from between $425 k and $450 k to between $425 k and $550 k. Accordingly, as control 6014 is moved to broaden the price range, the bar graphs for the other dimensions in the visual display component are dynamically increased. With the changed range for the master dimension, there are more items in the data set that correspond to the broadened price range, as illustrated by the general increase in respective bar graphs. The computing device may, in response to user input moving the specified range of the master dimension, re-compute the distributions associated with one or more of the subordinate dimensions.

A system as described herein may alternatively or additionally support other types of user interaction for exploring filter criteria in the visual display component. For example, a reverse solution may be explored. In such a scenario, a user may input information about a desired distribution in a subordinate dimension and the system may compute a range in the master dimension that, if applied as a filter criteria, would yield that distribution in the subordinate dimension. In the embodiment illustrated, a user may indicate a desired distribution in the subordinate dimension by indicating a desired value for a bar in a bar graph illustrating the distribution of items along the subordinate dimension.

Figure 19:
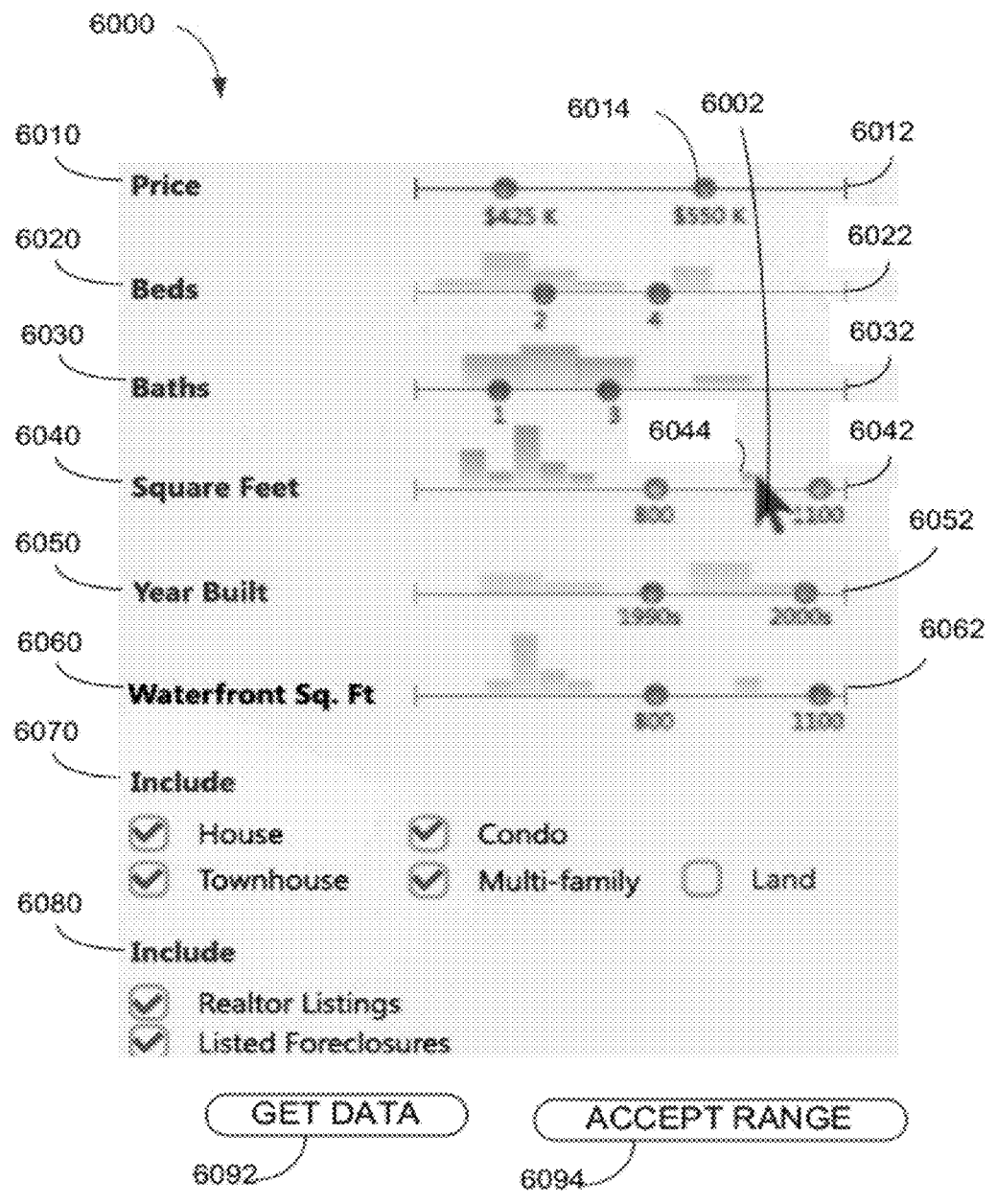

FIG. 19 illustrates a user having maneuvered pointer 6002 to bar 6044 of slider component 6042 in the visual display component, which corresponds to the square feet dimension 6040. In particular, bar 6044 has a height indicating a number of properties that meet the limits of the query and fall within the price range set on slider component 6012 and that have a square footage of about 1000. By selecting bar 6044 and moving an input device (e.g., mouse) to change the position of pointer 6002, the user is able to specify a number of properties having a square footage of about 1000 that the user would like to see in the filtered results.

Figure 20:
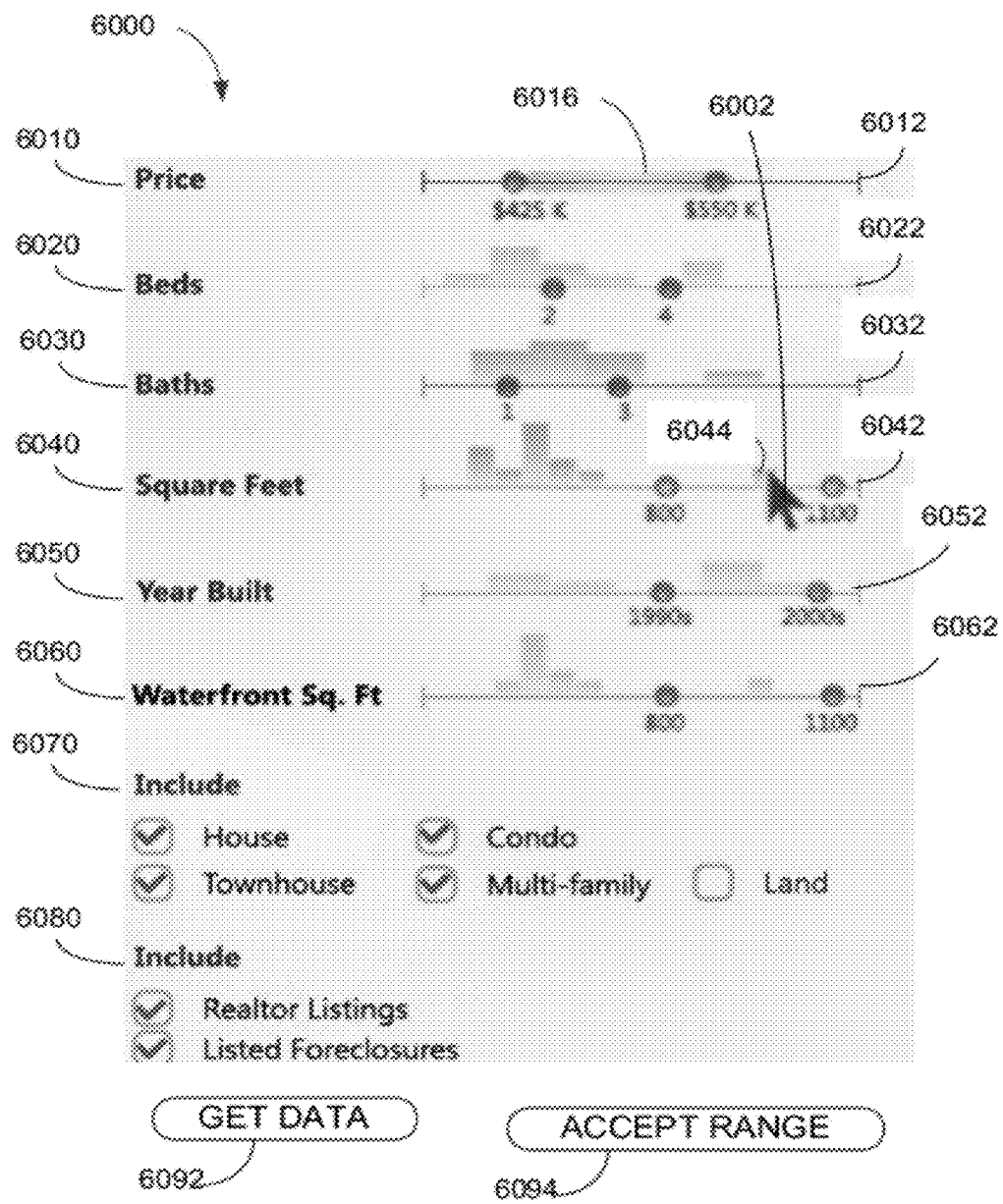
FIG. 20 is an illustration of the user interface of FIG. 19 where the number of items for the particular value in the subordinate dimension is being specified.

As the number of properties having about 1000 square feet changes in the visual display component, the system may dynamically compute a price range that generates this number of properties. In FIG. 20, the user has selected the bar 6044 that corresponds to the number of properties that have about 1000 square feet. Accordingly, the highlighted price range 6016 of dimension 6010 that generates this number is highlighted. In the scenario of FIG. 20, the height of bar 6044 was initially set based on the number of properties in the data set when filtered according to a price range of $425K to $550K. Accordingly, the highlighted price range corresponds to this price range.

Figure 21:
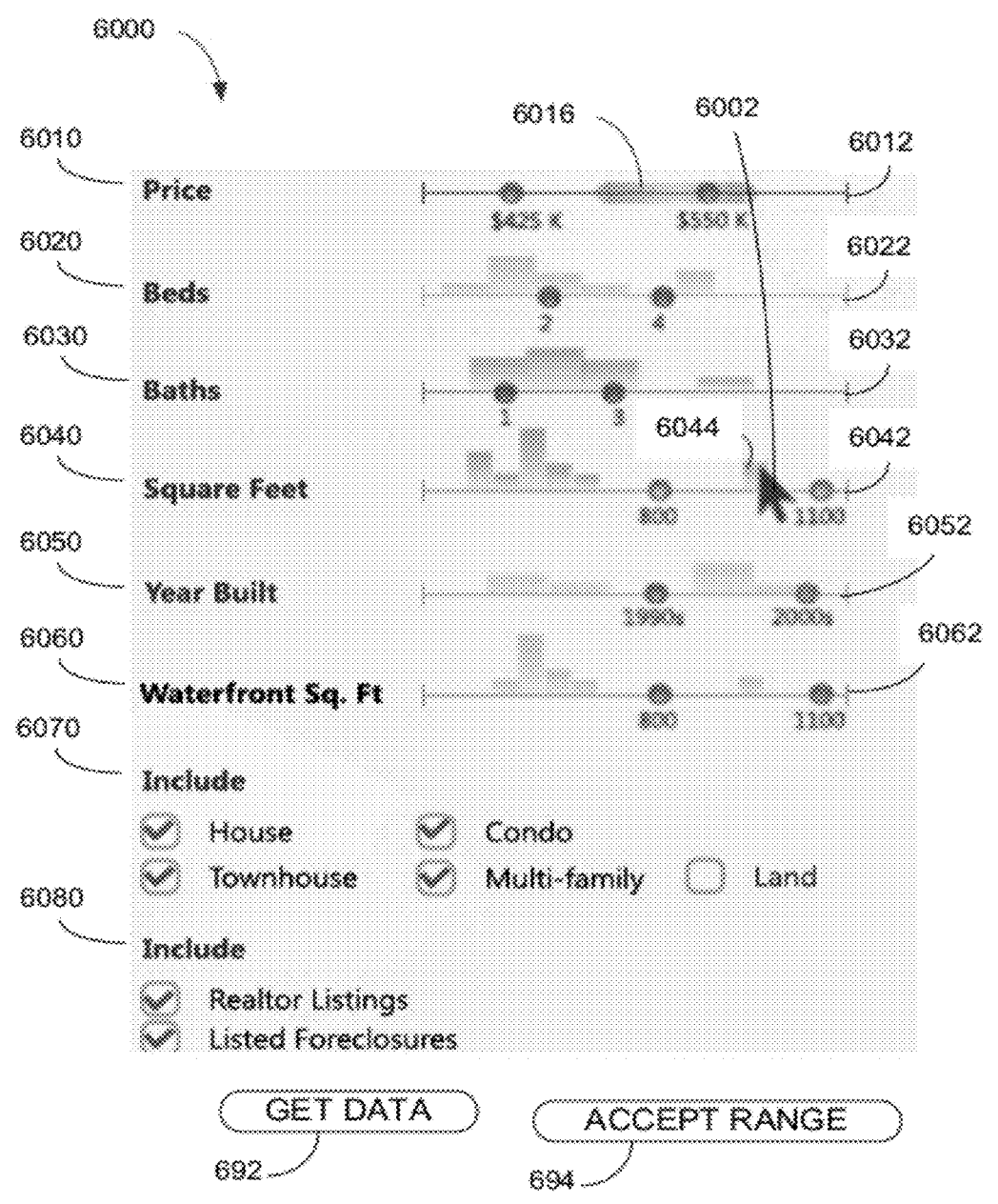

Turning to FIG. 21, the user has manipulated pointer 6002 to increase the height of bar 6044. As bar 6044 is increased in size, highlighted price range 6016 changes in the visual display component. In this case, highlighted price range 6016 shifts to a greater price point, while the range is narrowed.

Figure 22:
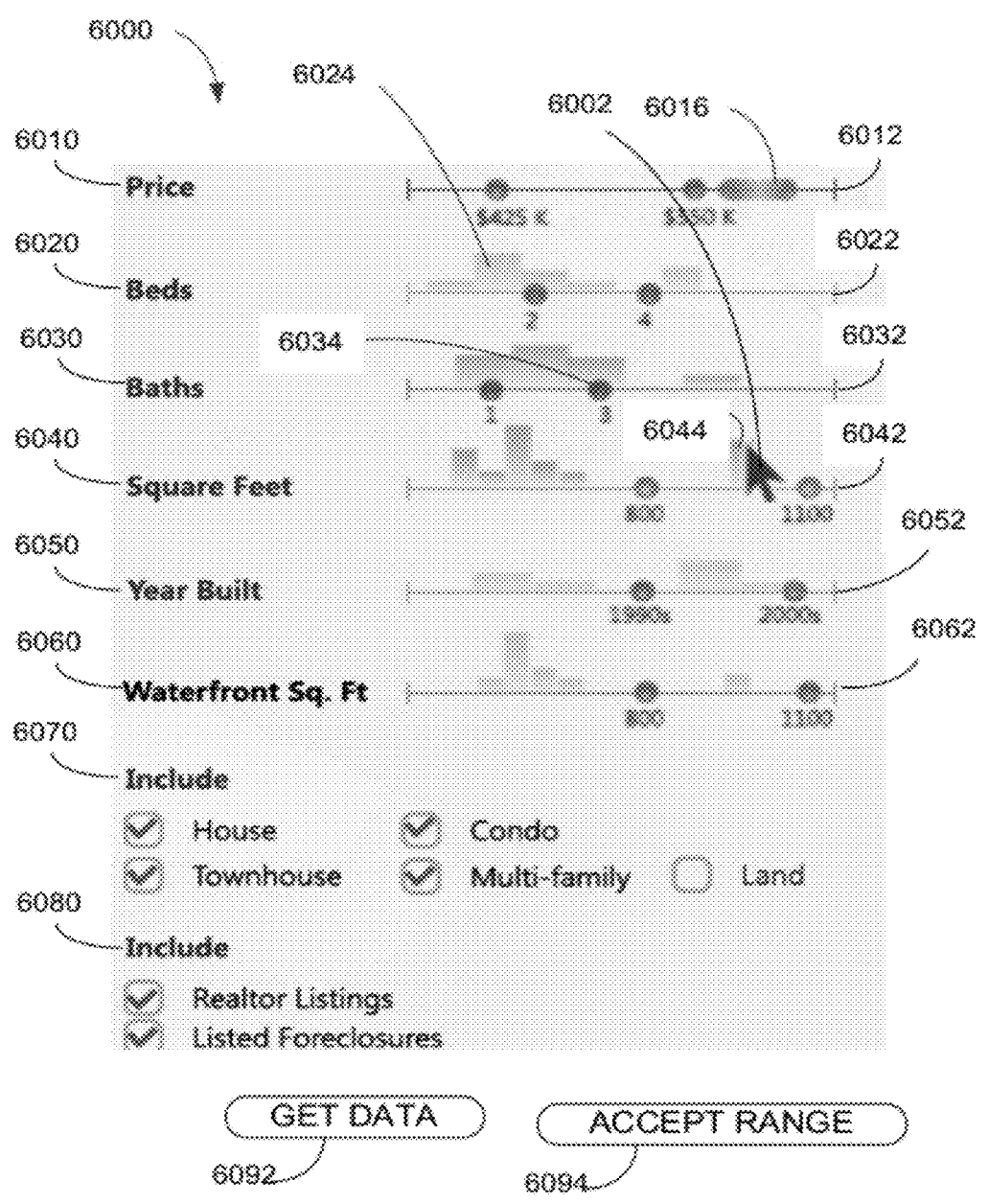

In FIG. 22, a user has provided input further increasing bar 6044 such that the user computer has recomputed highlighted price range 6016 and visual display component 6000 has been visually adjusted. In this example, by adjusting the number of real estate properties that have 1000 square feet, the highlighted price range for the master dimension is adjusted accordingly.

In this example, the highlighted price range is dynamically adjusted while the user raises bar 6044 on the square feet dimension 6040 corresponding to the number of properties in the data set that have 1000 square feet. If, upon adjusting the bar 6044, the user deems the resulting range for the master dimension is appropriate, the user may indicate that the highlighted range 6016 be accepted, such as by activating a control 6094. In this scenario, the controls indicating the range for dimension 6010 may be adjusted to correspond to highlighted range 6016.

Conversely, if upon viewing the change in visual display component 6000, the user may provide an input that indicates that the user does not accept the highlighted range 6016 as a filter criteria. In that scenario, the user computer may revert the visual display component 6000 to the state shown in FIG. 19 or take some other appropriate action.

Although not shown, it can be appreciated that other bars on the graph associated with dimension 6040 may be similarly adjusted or bars of graphs associated with other dimensions may be selected by a user and appropriately adjusted. For example, a user could maneuver pointer 6002 to bar 6024 of dimension 6020 that corresponds to the number of properties having 1 bedroom. Given that price dimension 6010 is still selected as the master dimension, adjustment of bar 6024 would, accordingly, result in highlighted price range 6016 being dynamically adjusted while portions of other dimensions remain constant.

Additionally, a different master dimension may be selected in the visual display component and the above described process may be re-applied. For example, dimension 6030 may be selected as a new master dimension. A user could maneuver pointer 6002 to upper limit icon 6034 of dimension 6030, which represents properties with a certain number of bathrooms. Subsequent adjustment of upper limit icon 6034 would result in bar graphs for the other dimensions, including price dimension 6010, to appropriately change.

Slider components in visual display component 6000 may be highly interactive, with little or no discernible latency in the appearance of changes in the displayed distributions and ranges when certain settings are changed, particularly when a summary of the data is utilized.

In this way, the user may explore filter criteria that generate results with a desired number of appropriately filtered items. As the user observes the effects of changing distributions along some dimensions on the range of filter criteria along another dimension, and observes the effect of changing the range of filter criteria on the distributions along other dimensions, the user may select appropriate filter criteria for one or more of the dimensions. As illustrated in FIGS. 16-22, each of the slider components associated with a dimension may include controls that can be manipulated to specify a range of values along that dimension that may act as a filter criteria.

Once the user has completed exploring of filter criteria and is satisfied with the number of items that fall within the parameters set forth through interactive exploring, the user may gain access to filtered data from the actual database subject to the desired criteria. For example, a user may activate control 6092, causing a client computer to generate a request for the filtered data set based on the current setting of the controls on each of the slider components. As a result of the input received by the visual display component to filter the original data set, a modified data set can now be accessed according to the specified criteria. Accordingly, after a suitable analysis based on the data available, the system may propose a visual display component 6000 for selection through a user interface.

In some embodiments, the system analyzes the data and the visual display component and determines whether it would be beneficial to incorporate one or more additional visual elements within the visual display component. For example, a visual display component may be modified to include additional operations that may be performed on dimensions of the data. Such an additional visual element may be proposed as a suggestion on a user interface for incorporation into the visual display component upon an appropriate user input.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, digitizing tablets, and touch-responsive display screen, such as direct-interaction displays, multi-touch displays that respond to two or more fingers on the screen at the same time. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of operating a computing device to construct a user interface for interacting with a data set, the method comprising:

with at least one processor:
identifying in the data set at least one dimension of variability of data in the data set;
analyzing a visual display component adapted to receive user input indicating a change in at least one dimension of data associated with the data set, the analyzing determining whether the visual display component is capable of (i) receiving user input representing change in the data set in one of the at least one identified dimensions and (ii) producing one or more visual outputs within the visual display component in response to the user input representing change in the data set in one of the at least one identified dimensions;

when the visual display component is determined to be capable of receiving user input representing change in the data set in each of the at least one identified dimensions, presenting to a user a suggestion for incorporating the visual display component in a user interface configured for interaction with the data set;

receiving a user input selecting the visual display component in the presented suggestion to the user; and in response to receiving the user input selecting the visual display component, incorporating the selected visual display component in the user interface for interaction with the data set by the user, wherein the incorporated visual display component is configured to allow manipulation of the data set along the one of the at least one dimensions of variability of data in the data set in response to the user input representing change in the data set in one of the at least one identified dimensions.

2. The method of claim 1, wherein:
the method further comprises determining a quantization of change in each of the at least one identified dimensions; and
wherein analyzing the visual display component comprises determining, for each of the at least one identified dimensions, whether the visual display component comprises a visually interactive component that can be adjusted with a quantization that matches the quantization of change in the dimension.

3. The method of claim 1, wherein:
identifying in the data set at least one dimension comprises analyzing metadata associated with the data set.

4. The method of claim 3, wherein:
analyzing the visual display component comprises analyzing metadata associated with the visual display component.

5. The method of claim 1, wherein:
the method further comprises selecting the visual display component from a library of visual display components.

6. The method of claim 1, wherein:
presenting to the user the suggestion for incorporating the visual display component in the user interface configured for interaction with the data set comprises presenting an animation showing a user interface based on the visual display component being adjusted.

7. The method of claim 1, wherein:
presenting to the user the suggestion for incorporating the visual display component in the user interface configured for interaction with the data set comprises presenting a menu of visual display components.

8. The method of claim 1, further comprising:
in response to user input selecting the visual display component, associating the visual display component with the data set.

9. The method of claim 1, wherein the data set comprises a display subset constructed from a database.

10. The method of claim 1, wherein the visual display component comprises a visual object having at least one visual characteristic representing the at least one dimension of variability of data in the set.

11. The method of claim 1, wherein the visual display component implements an analytic pattern for receiving a data input and outputting a result by evaluating at least one of an equation, rule, constraint or expression concerning the data input.

12. A computer system for processing a data set comprising at least one dimension of variability of data in the data set, comprising:
a storage device comprising a library of visual display components;
at least one processor configured to:
analyzing the data set to identify the at least one dimension of variability of data in the data set;
analyzing at least some of the visual display components in the library to identify in the library a visual display component capable of receiving a user input representing a change in one dimension in the data set, the change in the dimension matching at least a portion of the at least one dimension of variability of data in the data set, and wherein the identified visual display component is also capable of producing one or more visual outputs within the visual display component in response to the user input representing the change in the dimension in the data set;
generate an output suggesting use of the identified visual display component;
receive a user input selecting the suggested visual display component;
in response to receiving the user input requesting use of the suggested visual display component, generate a graphical user interface incorporating a representation of the identified visual display component; and
in response to user input manipulating the representation of the visual display component in the graphical user interface by providing input representing the change in the dimension in the data set, manipulating the data set along the at least one dimension of variability of data in the data set according to the user input.

13. The computer system of claim 12, wherein the visual display component comprises metadata associated with a visually interactive component for manipulating the data set and the data set comprises metadata associated with the at least one dimension of variability in the data set.

14. The computer system of claim 12, wherein the at least one processor is configured to present a menu of suggested visual display components on the graphical user interface.

15. A method of interacting with a data set, the method comprising:
through at least one processor:
selecting the data set having at least one dimension of data for user interaction, the data set having a variability of data along the at least one dimension;
analyzing a visual display component to determine a capability for (1) the visual display component to receive input from a user through a user interface indicating a change in the at least one dimension of the data set and (2) producing one or more visual outputs within the visual display component in response to the input indicating the change in the at least one dimension of the data set from the user;
when the visual display component is determined to be capable of (1) receiving input representing the change in the at least one dimension of the data set and (2) producing one or more visual outputs within the visual display component in response to the received user input indicating the change in the at least one dimension of the data set, proposing a suggestion to the user for incorporating the visual display component configured for interacting with the data set in the user interface;
receiving a user input selecting the visual display component in the proposed suggestion to the user;
incorporating the selected visual display component in the user interface for interaction with the data set; and receiving input applying the visual display component to the at least one dimension of data in the data set according to the pattern of visual interactivity.

16. The method of claim 15, wherein the visual display component includes metadata defining the pattern of visual interactivity with the at least one dimension of data in the data set.

17. The method of claim 16, wherein analyzing the visual display component comprises analyzing the metadata to determine a visual object or a visual affordance that can be incorporated in the user interface for interaction with the at least one dimension of data in the data set.

18. The method of claim 15, wherein the pattern of visual interactivity includes at least one of a continuous change, a quantizable change, a position change, or a traversal through data alternatives.

19. The method of claim 18, wherein the continuous change includes at least one of a slider, a text box, or a resizing of a visual object; the quantizable change includes at least one of a check box, a menu selector, or a snap-to feature in a visual object scaling; the position change includes at least one of a moveable object defined by a Cartesian geometry; and the traversal through data alternatives includes at least one of an implementation to scroll through data, an implementation to flip through portions of data, or an implementation to focus on a portion of data.

20. The method of claim 15, wherein proposing the suggestion for incorporating the visual display component comprises generating multiple choices of visual objects or visual affordances that visually display on the user interface an effect of the pattern of visual interactivity with the at least one dimension of data.

* * * * *